US012467422B2

(12) United States Patent
Wall, II

(10) Patent No.: US 12,467,422 B2
(45) Date of Patent: *Nov. 11, 2025

(54) SYSTEMS AND METHODS FOR THE ON-BOARD CATALYTIC PRODUCTION OF HYDROGEN FROM PHASE-CONTROLLED GASEOUS AMMONIA

(71) Applicant: First Ammonia Motors, Inc., Concord, NC (US)

(72) Inventor: James L. Wall, II, Concord, NC (US)

(73) Assignee: First Ammonia Motors, Inc., Concord, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/241,321

(22) Filed: Sep. 1, 2023

(65) Prior Publication Data

US 2024/0044285 A1    Feb. 8, 2024

Related U.S. Application Data

(63) Continuation-in-part of application No. 17/986,265, filed on Nov. 14, 2022, now Pat. No. 11,840,449.
(Continued)

(51) Int. Cl.
*C01B 3/04*        (2006.01)
*F02M 21/02*       (2006.01)
(Continued)

(52) U.S. Cl.
CPC ......... *F02M 21/0227* (2013.01); *C01B 3/047* (2013.01); *F02M 21/0206* (2013.01);
(Continued)

(58) Field of Classification Search
CPC ........ F02B 43/10; B01J 23/755; C01B 3/047; F02M 21/0206; F02M 21/0218
(Continued)

(56) References Cited

U.S. PATENT DOCUMENTS 4,480,595 A    11/1984   Hobby et al.
5,976,723 A    11/1999   Boffito et al.
(Continued)

FOREIGN PATENT DOCUMENTS

WO        WO 02086987    * 10/2002

OTHER PUBLICATIONS

B. Zohuri, P. McDaniel, Thermodynamics in Nuclear Power Plant Systems, 2019, pp. 317-350. (Year: 2019).*
(Continued)

*Primary Examiner* — Jennifer A Leung

(57) ABSTRACT

The present invention relates, in general, to systems and methods for generating hydrogen from ammonia on-board vehicles, where the produced hydrogen is used as fuel source for an internal combustion engine. The present invention utilizes an electric catalyst unit operating in series with a plate-type heat exchange catalyst unit. The electric catalyst unit is used to initiate an ammonia cracking process on-board during a cold start or low load operating condition of the internal combustion engine, where the ammonia cracking process occurs in the heat exchange catalyst unit once exhaust gas from the internal combustion engine has been heated to a threshold temperature suitable to perform the ammonia cracking process.

20 Claims, 19 Drawing Sheets

Related U.S. Application Data

(60) Provisional application No. 63/395,820, filed on Aug. 6, 2022.

(51) Int. Cl.
 *F02M 21/06* (2006.01)
 *F02M 27/02* (2006.01)

(52) U.S. Cl.
 CPC ...... *F02M 21/0218* (2013.01); *F02M 21/023* (2013.01); *F02M 21/06* (2013.01); *F02M 27/02* (2013.01); *C01B 2203/0277* (2013.01); *C01B 2203/0811* (2013.01); *C01B 2203/085* (2013.01); *C01B 2203/1035* (2013.01); *C01B 2203/142* (2013.01)

(58) Field of Classification Search
 USPC ...................................... 423/658.2
 See application file for complete search history.

(56) References Cited

U.S. PATENT DOCUMENTS

| | | | |
|---|---|---|---|
| 6,588,211 B2 | 7/2003 | Friebe et al. | |
| 6,936,363 B2 | 8/2005 | Kordesch et al. | |
| 7,867,300 B2 | 1/2011 | Chellappa et al. | |
| 8,025,033 B2 | 9/2011 | Schiltz et al. | |
| 8,166,926 B2 | 5/2012 | Sasaki et al. | |
| 8,272,353 B2 | 9/2012 | Dincer et al. | |
| 8,561,578 B2 | 10/2013 | Miyagawa et al. | |
| 8,904,765 B2 | 12/2014 | Miyagawa et al. | |
| 8,961,923 B2 | 2/2015 | Grannell et al. | |
| 9,249,720 B2 | 2/2016 | Miyagawa et al. | |
| 9,506,400 B2 | 11/2016 | Tange et al. | |
| 10,961,890 B2 | 3/2021 | Sung et al. | |
| 11,286,831 B2 | 3/2022 | Al-Rub et al. | |
| 12,162,754 B2* | 12/2024 | Wall, II | F02M 21/0227 |
| 2002/0028171 A1 | 3/2002 | Goetsch et al. | |
| 2011/0283960 A1* | 11/2011 | Hikazudani | B01J 23/42 |
| | | | 123/3 |
| 2011/0293510 A1 | 12/2011 | Grannell et al. | |
| 2014/0105816 A1* | 4/2014 | Grannell | C01B 3/06 |
| | | | 422/198 |
| 2014/0238316 A1 | 8/2014 | Tange et al. | |
| 2014/0356738 A1 | 12/2014 | Bell et al. | |
| 2018/0230006 A1* | 8/2018 | Finkelshtain | C01B 3/04 |
| 2022/0268200 A1* | 8/2022 | Seba | F01N 3/36 |
| 2023/0053230 A1* | 2/2023 | Jo | B01J 37/08 |

OTHER PUBLICATIONS

Comotti et al., "Hydrogen generation system for ammoniae hydrogen fuelled internal combustion engines", International Journal of Hydrogen Energy 40(33):10673-10686, Sep. 2015.

Ammonigy GMBH, "Part 1: With ammonia to CO2-free and cost-effective heavy-duty transport", 2022.

De Vries, "Safe and effective application of ammonia as a marine fuel", Delft University of Technology, 2019.

Abd Ali et al., "Ammonia as Hydrogen Storage Media, Sustainable Method to Hydrogen Evolution", 2018 J. Phys.: Conf. Ser. 1032.

* cited by examiner

SYSTEMS AND METHODS FOR THE ON-BOARD CATALYTIC PRODUCTION OF HYDROGEN FROM PHASE-CONTROLLED GASEOUS AMMONIA

CROSS REFERENCE TO RELATED APPLICATIONS

This application is a continuation-in-part of U.S. Non-Provisional patent application Ser. No. 17/986,265 entitled "SYSTEMS AND METHODS FOR THE CATALYTIC PRODUCTION OF HYDROGEN FROM AMMONIA ON-BOARD MOTOR VEHICLES" filed on Nov. 14, 2022, which claims the benefit of U.S. Provisional Patent Application No. 63/395,820 entitled "SYSTEMS AND METHODS FOR THE CATALYTIC PRODUCTION OF HYDROGEN FROM AMMONIA ON-BOARD MOTOR VEHICLES" filed on Aug. 6, 2022, U.S. Provisional Patent Application No. 63/355,959 entitled "SYSTEMS AND METHODS FOR THE CATALYTIC PRODUCTION OF HYDROGEN FROM AMMONIA ON-BOARD MOTOR VEHICLES" filed on Jun. 27, 2022, and U.S. Provisional Patent Application No. 63/312,121 entitled "SYSTEMS AND METHODS FOR THE CATALYTIC PRODUCTION OF HYDROGEN FROM AMMONIA ON-BOARD MOTOR VEHICLES" filed on Feb. 21, 2022, all of which are commonly owned, the disclosure of each is incorporated herein by reference in their entireties.

BACKGROUND

Field of the Invention

The present invention relates, in general, to systems and methods for generating hydrogen from ammonia on-board vehicles, where the produced hydrogen is used as fuel source for an internal combustion engine.

Description of Related Art

The increase in the overall temperature on and above Earth's surface represents a critical challenge facing the planet. Earth's climate is significantly changing mainly due to human activities, and the transportation sector plays a prominent role in this global warming. For example, internal combustion engines have traditionally burned fossil fuels, which in turn produces $CO_2$ a known contributor to global warming. Over the last decade, the transportation sector has made strides in making electric- and hybrid-powered vehicles available on a mass scale. Generally speaking, most electric and hybrid vehicles sold today tend to produce significantly fewer global warming emissions than most vehicles operating on fossil fuels, namely gasoline. However, the environmental benefits of electric and hybrid vehicles still depend primarily on how much fossil fuel is being burned to charge these vehicles. For example, if the vehicles are charged using a coal-heavy power grid, the environmental benefits are lessened.

Furthermore, the batteries and fuel cells in electrified vehicles rely on raw materials such as cobalt, lithium and rare earth elements. These materials have been linked to grave environmental and human rights concerns. For instance, cobalt has been especially problematic. Mining cobalt produces hazardous tailings and slags that can leach into the environment, and studies have found high exposure rates of cobalt and other metals in communities surrounding cobalt mining and processing facilities. Extracting such metals from their ores also requires a process called smelting, which can emit sulfur oxide and other harmful air pollution.

Given the sustained environmental issues that currently exist with electrified vehicles, ammonia has been suggested as an alternative to fossil fuels for use in internal combustion engines, given its relatively high energy density and zero $CO_2$ emissions when combusted. However, pure ammonia cannot efficiently be used as a fuel in small internal combustion engines, whether spark-ignited (i.e., gasoline), or compression ignited (i.e., diesel), because pure ammonia burns too slowly to complete combustion during the power stroke in a four-stroke engine operating at speeds of thousands of revolutions per minute (RPM). In other words, when ammonia is combusted, the combustion produces a flame with a relatively low propagation speed. This low combustion rate of ammonia causes combustion to be inconsistent under low engine load and high engine speed operating conditions.

Prior approaches to fueling combustion engines with ammonia have required mixing ammonia with a secondary combustion promoter fuel, such as gasoline, liquefied petroleum, or diesel. However, the requirement for a secondary combustion promoter fuel fluctuates with varying engine loads and engine speed, which can cause control issues. Thus, using a secondary combustion promotor fuel typically requires an additional control mechanism that must be part of the engine management system.

Hydrogen has also been suggested as an alternative to fossil fuels for use in internal combustion engines, as it is extremely plentiful, and can match the power of gasoline or diesel given its lower heating value. Hydrogen has a high flame velocity and a low ignition temperature, making it easy to ignite, and it is known to burn approximately six times faster than gasoline. Most importantly, hydrogen produces zero $CO_2$ emissions when combusted.

However, a challenge with using hydrogen on-board a vehicle is that it is an extremely light, low-density gas, and it cannot be stored as easily as liquid fossil fuels. Hydrogen requires compression, cooling, or a combination of both. The use of compressed hydrogen fuel tanks on-board vehicles inherently leads to a number of safety issues, such as the risk of potential failure of the pressure vessel, leakage of hydrogen in a confined space, and the like.

It is known that hydrogen can be obtained from ammonia by catalytic decomposition into its constituent hydrogen and nitrogen components through a process referred to as "cracking". However, the ammonia cracking process is an endothermic process which requires heat. With a limited electrical supply on-board a motor vehicle, it is difficult to generate the heat required to efficiently perform the ammonia crack on-board.

Therefore, there is a need for systems and methods to generate hydrogen from ammonia on-board vehicles for use as an internal combustion engine fuel source which addresses the aforementioned challenges and drawbacks of electrified vehicles, ammonia-fueled internal combustion engines, and the on-board storage of hydrogen for hydrogen fueled internal combustion engines.

SUMMARY

In an embodiment, the present invention is directed to a system for on-board ammonia cracking for an internal combustion engine, comprising: an ammonia tank containing liquid ammonia; a heat exchange catalyst unit fluidly coupled to the ammonia tank, wherein the heat exchange catalyst unit receives exhaust gas from the internal combustion engine, and wherein the heat exchange catalyst unit includes a plate heat exchanger; and an electric catalyst unit fluidly coupled in series to the heat exchange catalyst unit, wherein gaseous ammonia flows from the ammonia tank to the heat exchange catalyst unit upon vaporization of the liquid ammonia, wherein the gaseous ammonia undergoes a cracking process in the heat exchange catalyst unit if the exhaust gas has reached a temperature sufficient to perform ammonia cracking, and wherein the gaseous ammonia exits the heat exchange catalyst unit and flows to the electric catalyst unit and undergoes the cracking process in the electric catalyst unit if the exhaust gas has not reached a temperature sufficient to perform ammonia cracking.

In another embodiment, the present invention is directed to a system for on-board ammonia cracking for an internal combustion engine, comprising: an ammonia tank containing ammonia; a heat exchange catalyst unit fluidly coupled to the ammonia tank, wherein the heat exchange catalyst unit receives exhaust gas from the internal combustion engine and receives the ammonia from the ammonia tank, and wherein the heat exchange catalyst unit includes a plate heat exchanger; and an electric catalyst unit fluidly coupled in series to the heat exchange catalyst unit, the electric catalyst unit including an electric heater, wherein the ammonia undergoes a cracking process in the heat exchange catalyst unit if the exhaust gas has reached a temperature sufficient to perform ammonia cracking, wherein the ammonia exits the heat exchange catalyst unit and flows to the electric catalyst unit and undergoes the cracking process in the electric catalyst unit if the exhaust gas has not reached a temperature sufficient to perform ammonia cracking, and wherein hydrogen resulting from the cracking process flows to the internal combustion engine.

In yet another embodiment, the present invention is directed to a system for on-board ammonia cracking for an internal combustion engine, comprising: an ammonia tank containing ammonia; a heat exchange catalyst unit fluidly coupled to the ammonia tank, wherein the heat exchange catalyst unit receives exhaust gas from the internal combustion engine and receives the ammonia from the ammonia tank, and wherein the heat exchange catalyst unit includes a plate heat exchanger; and an electric catalyst unit fluidly coupled in series to the heat exchange catalyst unit, the electric catalyst unit powered using a vehicle power system, wherein the ammonia undergoes a cracking process in the heat exchange catalyst unit if the exhaust gas has reached a temperature sufficient to perform ammonia cracking, and if the exhaust gas has not reached a temperature sufficient to perform ammonia cracking: (1) the ammonia is pre-heated in the heat exchange catalyst unit, (2) the pre-heated ammonia exits the heat exchange catalyst unit and flows to the electric catalyst unit, and (3) the pre-heated ammonia undergoes the cracking process in the electric catalyst unit.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
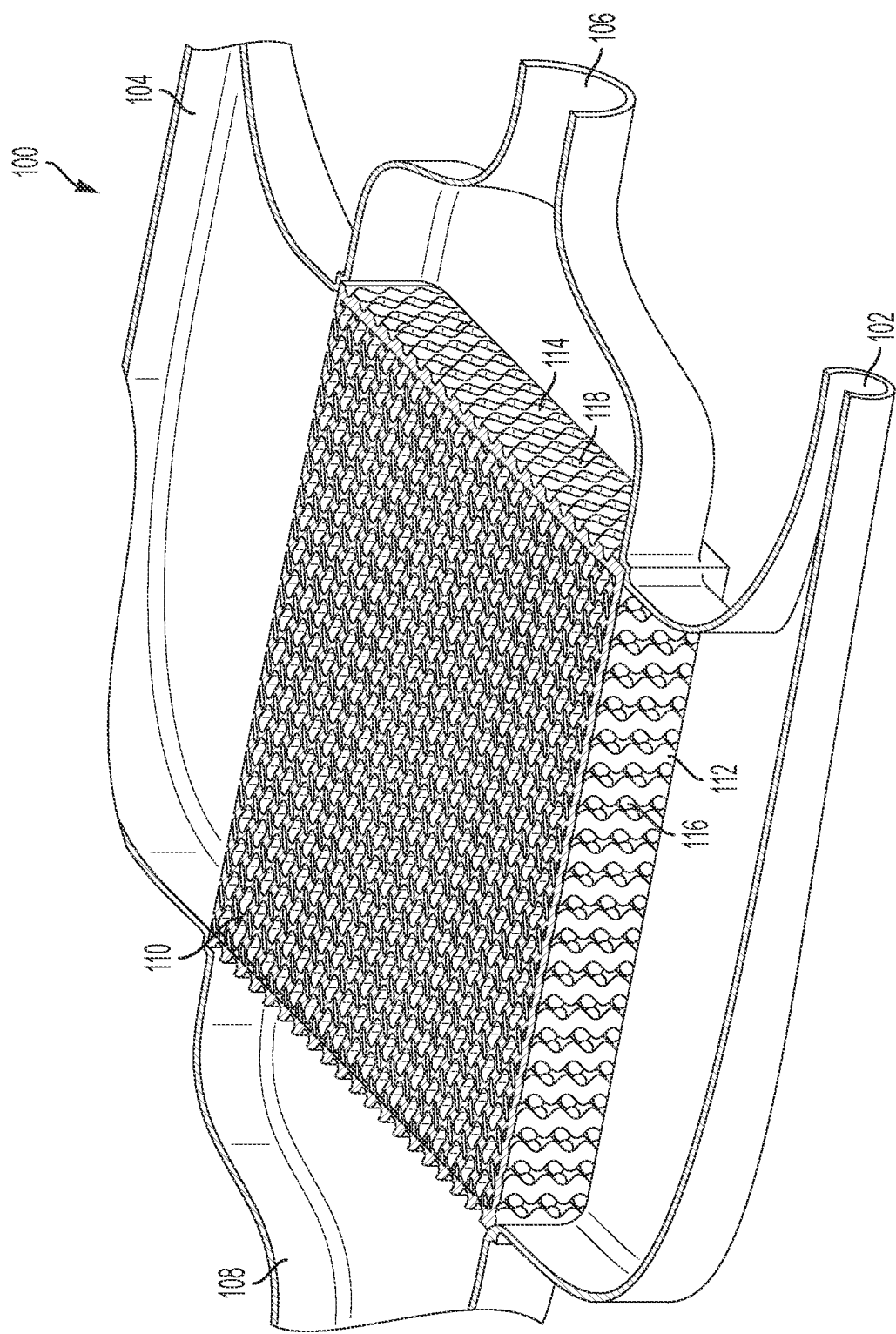
FIG. 1 is a perspective internal view of an exchange catalyst unit that utilizes a TPMS structure.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "motor vehicle" refers to any moving vehicle that is capable of carrying one or more human occupants and/or cargo, or which is capable of performing a task, and which is powered by any form of energy. The term "motor vehicle" includes, but is not limited to: (a) vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting cracking reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the term "cracking" refers to a process or processes by which ammonia is decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel® 625, Inconel® 718, Inconel 725, and other compound metals having nickel as a main component. Inconel® is the trademark of Special Metals Corporation of Huntington, West Virginia.

As used herein the term "triply-periodic minimal surface (TPMS)" refers to mathematically defined structures that repeat in three dimensions with zero mean curvatures and large surface areas.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an internal combustion engine for a motor vehicle, it is understood that the system could be implemented in any engine-driven setting that may be powered by ammonia and/or hydrogen fuel.

FIG. 1 is a perspective internal view of a heat exchange catalyst unit that utilizes a TPMS structure, and which serves as a heat exchanger as well as a catalytic converter that performs ammonia cracking. The heat exchange catalyst unit 100 is metallic, and in an embodiment, includes a gaseous ammonia inlet 102, a hydrogen outlet 104, a heated exhaust gas inlet 106, and an exhaust gas outlet 108. In an embodiment, the heat exchange catalyst unit 100 is made from a nickel alloy. In a preferred embodiment, the heat exchange catalyst unit 100 is made from Inconel® 625.

In an embodiment, the gaseous ammonia inlet 102, the hydrogen outlet 104, the heated exhaust gas inlet 106, and the exhaust gas outlet 108 can be made from the same metallic material as the heat exchange catalyst unit 100. In another embodiment, the gaseous ammonia inlet 102, the hydrogen outlet 104, the heated exhaust gas inlet 106, and the exhaust gas outlet 108 can be made from stainless steel, silver, bronze, and comparable alloys.

Positioned between the inlets 102, 106 and outlets 104, 108 is a matrix 110. The matrix 110 is formed from width-wise surfaces 112 and length-wise surfaces 114 which run generally perpendicular to each other. The surfaces 112, 114 of the matrix 110 create passages that allow the gaseous ammonia and heated exhaust gas to flow; these passages are indicated by the ammonia channels 116 and heated exhaust gas channels 118. Gaseous ammonia is supplied to heat exchange catalyst unit 100 via inlet 102, while heated exhaust gas is concurrently supplied to inlet 106. The gaseous ammonia traverses the matrix 110 via ammonia channels 116, while the heated exhaust gas traverses the matrix via heated exhaust gas channels 118. The ammonia channels 116 and the heated exhaust gas channels 118 are orientated in a generally perpendicular fashion to one another, such that the gaseous ammonia traverses the matrix 110 at approximate right angles relative to the heated exhaust gas.

In an embodiment, the surfaces 112, 114 have a thickness of 1 to 2 millimeters, and each of the surfaces 112, 114 can have the same thickness. In another embodiment, the surfaces 112, 114 can each have a different thickness. In yet another embodiment, the surfaces 112, 114 may vary in thickness as they each traverse across the matrix 110. For example, the surfaces 112, 114 may not have a uniform thickness across the width of the matrix 110, and may have thicker or narrower portions at various locations.

As shown in FIG. 1, the matrix 110 physically separates the gases passing through each of the channels 116, 118, thereby providing an exceptionally large surface area throughout the matrix 110 where the heated exhaust gas exchanges its heat with the gaseous ammonia. In an embodiment, the surfaces 112, 114 of the matrix 110 are coated with a catalyst that facilitates the cracking of ammonia into constituent hydrogen and nitrogen components. In this embodiment, the surfaces 112, 114 of the matrix 110 are coated with the catalyst using a washcoating or deposition technique to bind or adhere the catalyst to the surfaces 112, 114.

In another embodiment, catalyst in the form of discrete catalyst media is deposited into the passages forming the ammonia channels 116 and heated exhaust gas channels 118. The discrete catalyst media can be porous, allowing the gaseous ammonia and exhaust gas to pass through the catalyst as they each flow through the matrix 110.

In yet another embodiment, the surfaces 112, 114 of the matrix 110 can be coated with a catalyst as described herein, and additional discrete catalyst media can be deposited into the passages forming the ammonia channels 116 and heated exhaust gas channels 118.

In an embodiment, the matrix 110 is metallic, and is made from a nickel alloy. In a preferred embodiment, the matrix 110 is made from Inconel® 625. The heat exchange catalyst unit 100 and matrix 110 may be constructed from the same metallic material. In another embodiment, the heat exchange catalyst unit 100 and matrix 110 can be constructed from different metallic materials.

The material(s) selected for the heat exchange catalyst unit 100 and matrix 110 need to have the ability to withstand the corrosive environment resulting from the high-temperature heated exhaust gas, as well as the heated hydrogen gas which is generated from the cracking of ammonia.

In a preferred embodiment, the matrix 110 is in the form of a triply-periodic minimal surface (TPMS), and the matrix 110 is three-dimensionally (3D) printed using powdered metal. The 3D printing process is an additive manufacturing process that uses laser sintering to selectively fuse together particles of the powdered metal into a TPMS structure in a layer-by-layer strategy. The TPMS structure of the matrix 110 provides for a relatively large surface area comprising cells which can be confined within the dimensions and shape of the heat exchange catalyst unit 100.

The TPMS structure can take on a variety of crystalline-like structures which have different patterns and profiles. In the embodiment shown in FIG. 1, the TPMS is a gyroid structure. The structures can be in the form of, but are not limited to, gyroid, diamond, orthogonal holes, split pea, among many others. Each of these forms has a different surface area. For example, in the embodiment shown in FIG. 1, the heat exchange catalyst unit 100 has dimensions of approximately 10×10×4 inches. For a matrix 110 which fits within these dimensions, Table 1 provides approximate surface area values for the various TPMS structure that may be utilized:

TABLE 1

| Structure | Surface Area (million millimeters$^2$) |
| --- | --- |
| Gyroid | 1.5 million mm$^2$ |
| Orthogonal holes | 1.6 million mm$^2$ |
| Split pea | 2.1 million mm$^2$ |
| Diamond | 2.5 million mm$^2$ |

It is noted however, that the values in Table 1 are illustrative examples only and are not intended to be in any way limiting. The individual cell sizes of the TPMS can be modified to increase or decrease the surface area of the matrix 110. For example, within the same volume of the heat exchange catalyst unit 100, the individual cell size can be increased to increase the overall surface area of the matrix 110, and conversely, the individual cell size can be decreased to decrease the overall surface area of the matrix 110.

The TPMS structure is ideal for the matrix 110 as it allows heat to be distributed to all surfaces of the matrix 100, thereby facilitating the chemical reaction required for the ammonia cracking process. As the surface area of the matrix 110 increases, there is an inherent challenge in cleaning the surfaces of the matrix 110 after it is printed, given that the formation of the channels 116, 118 become narrower relative to one another as the surface area increases. However, as the cell size of the matrix 110 increases, the surface area decreases, which decreases the throughput efficiency of the heat exchange catalyst unit 100. The surface area of the matrix 110 can depend on the power requirements of the motor vehicle and its engine.

In an embodiment, the heat exchange catalyst unit 100 is sized and dimensioned to accommodate a matrix 110 with sufficient surface area to facilitate the cracking process, while still having a form factor that is suitable for placement within a motor vehicle. The dimensions of the heat exchange catalyst unit 100 can vary, and can range from 5 to 30 inches in width, 5 to 30 inches in length, and 0.5 to 12 inches in height.

In an embodiment, the heat exchange catalyst unit 100 has a generally square shape which accommodates a square-shaped matrix 110, as shown in FIG. 1, which is an illustrative example only and is not intended to be in any way limiting. In other embodiments, the heat exchange catalyst unit 100 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

In an embodiment, the ammonia inlet 102 has a smaller diameter than the heated exhaust gas inlet 106, as the exhaust gas flow rate may be orders of magnitude higher than the ammonia flow rate. As with the dimensions of the heat exchange catalyst unit 100, the diameters, shape, and sizes of the inlets 102, 106, and outlets 104, 108 can vary based on the power requirements of the motor vehicle and its engine.

Figure 2:
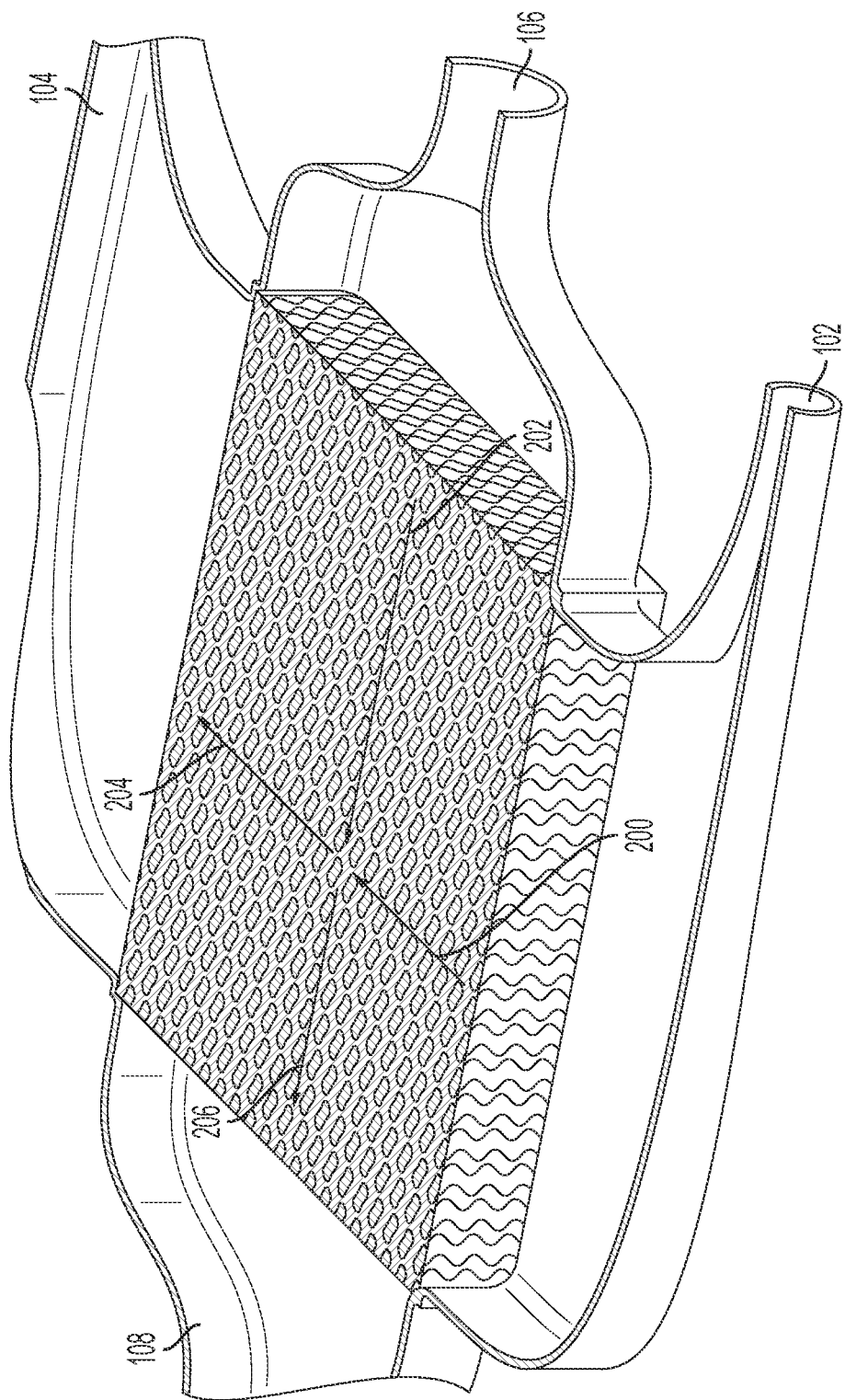
FIG. 2 is a perspective internal view of the heat exchange catalyst unit that utilizes a TPMS structure which depicts the flow of heated exhaust gas and gaseous ammonia through the matrix.

FIG. 2 is a perspective internal view of the heat exchange catalyst unit 100 that utilizes a TPMS structure which depicts the flow of heated exhaust gas and gaseous ammonia through the matrix. In operation, gaseous ammonia 200 is supplied to the inlet 102 and flows through the ammonia channels 116, while heated exhaust gas 202 is concurrently supplied to the inlet 106 and flows through the heated gas channels 118. The heated exhaust gas 202 heats the catalyst, resulting in cracking of the gaseous ammonia 200 into constituent hydrogen and nitrogen components 204. The resulting hydrogen and nitrogen components 204 exit the heat exchange catalyst unit 100 via the outlet 104 and are supplied to the downstream injection system for the engine, while residual exhaust gas 206 exits the heat exchange catalyst unit via the outlet 108.

Figure 3:
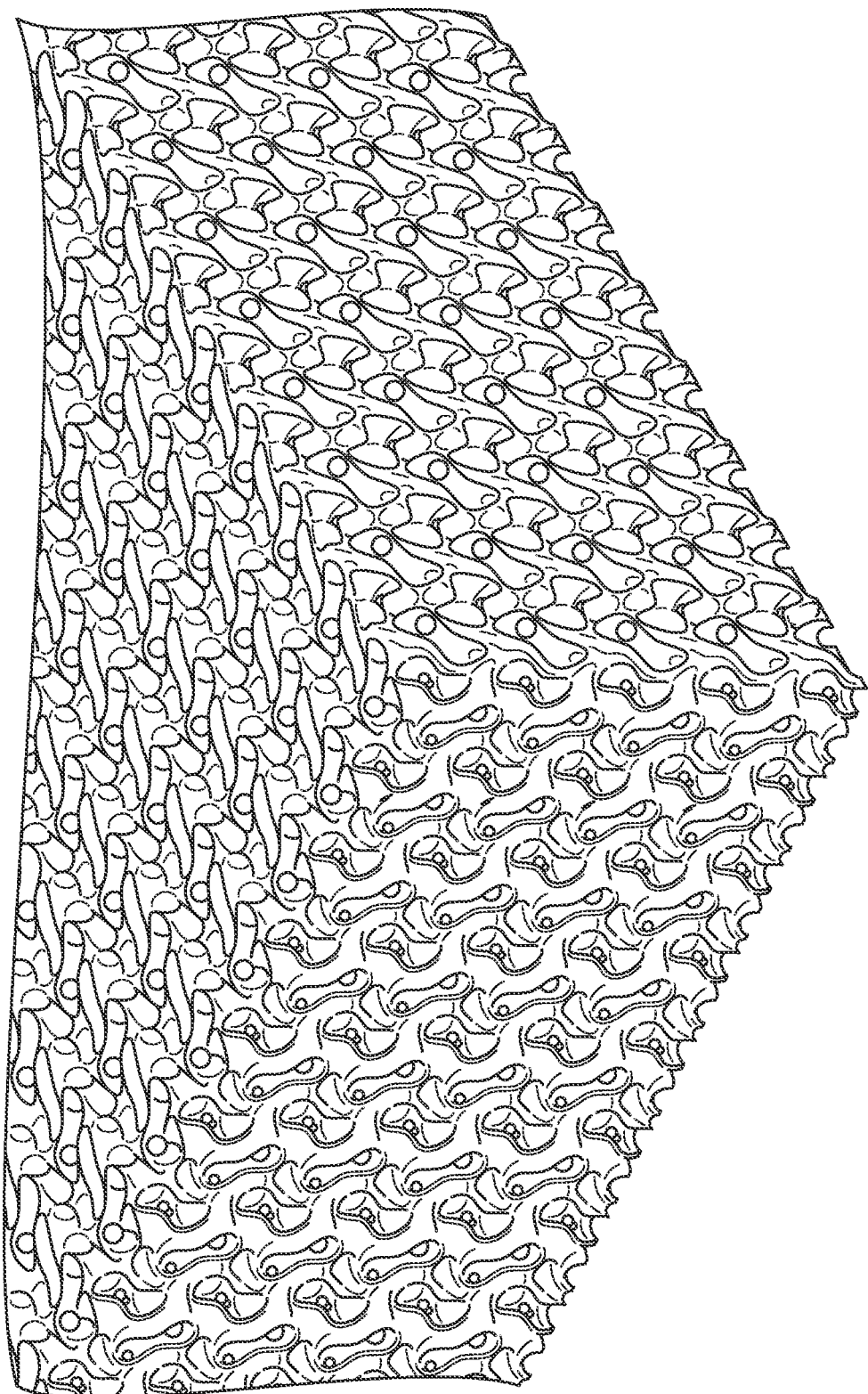
FIG. 3 is a perspective view of the matrix having a gyroid TPMS structure.
Figure 4:
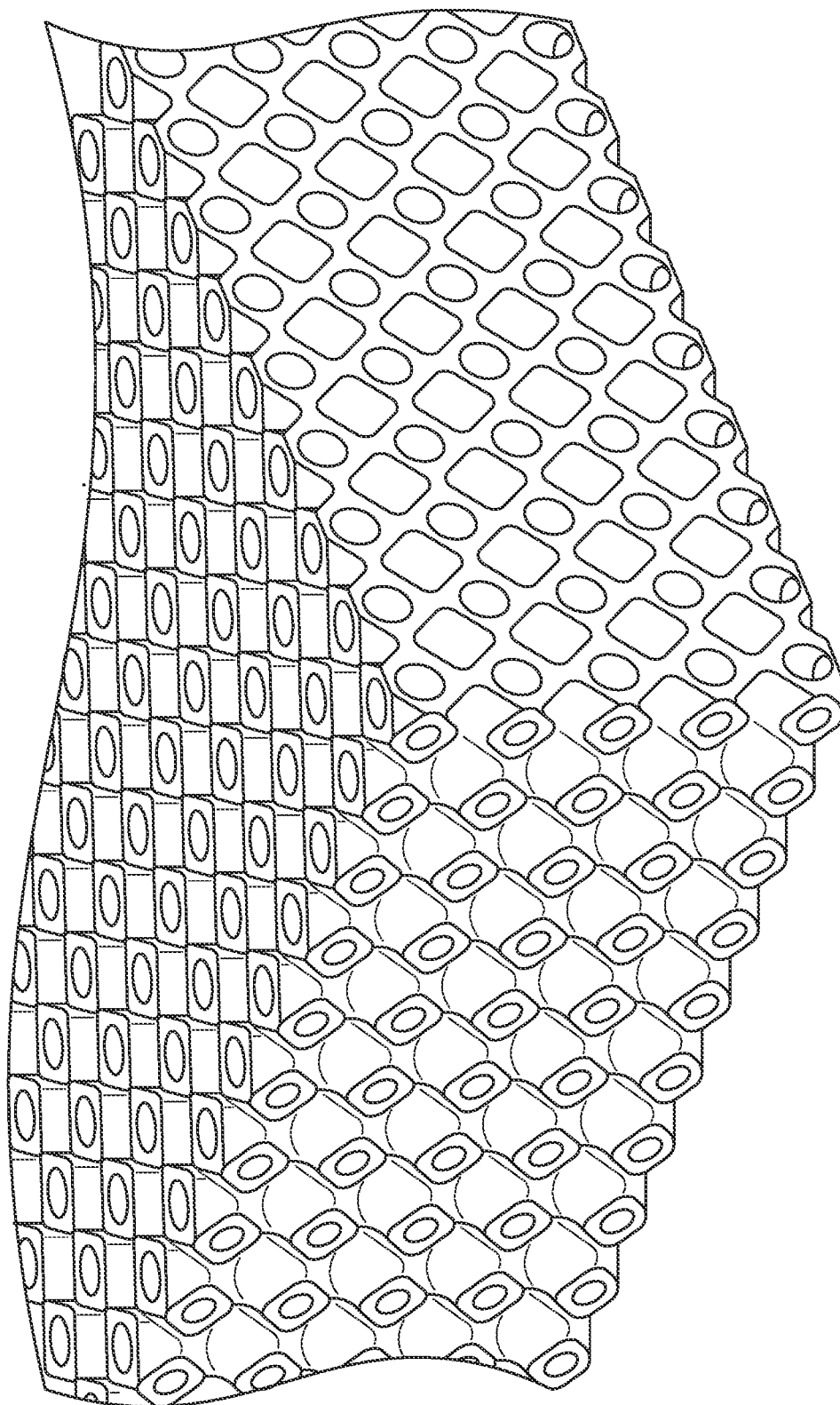
FIG. 4 is a perspective view of the matrix having an orthogonal hole TPMS structure.
Figure 5:
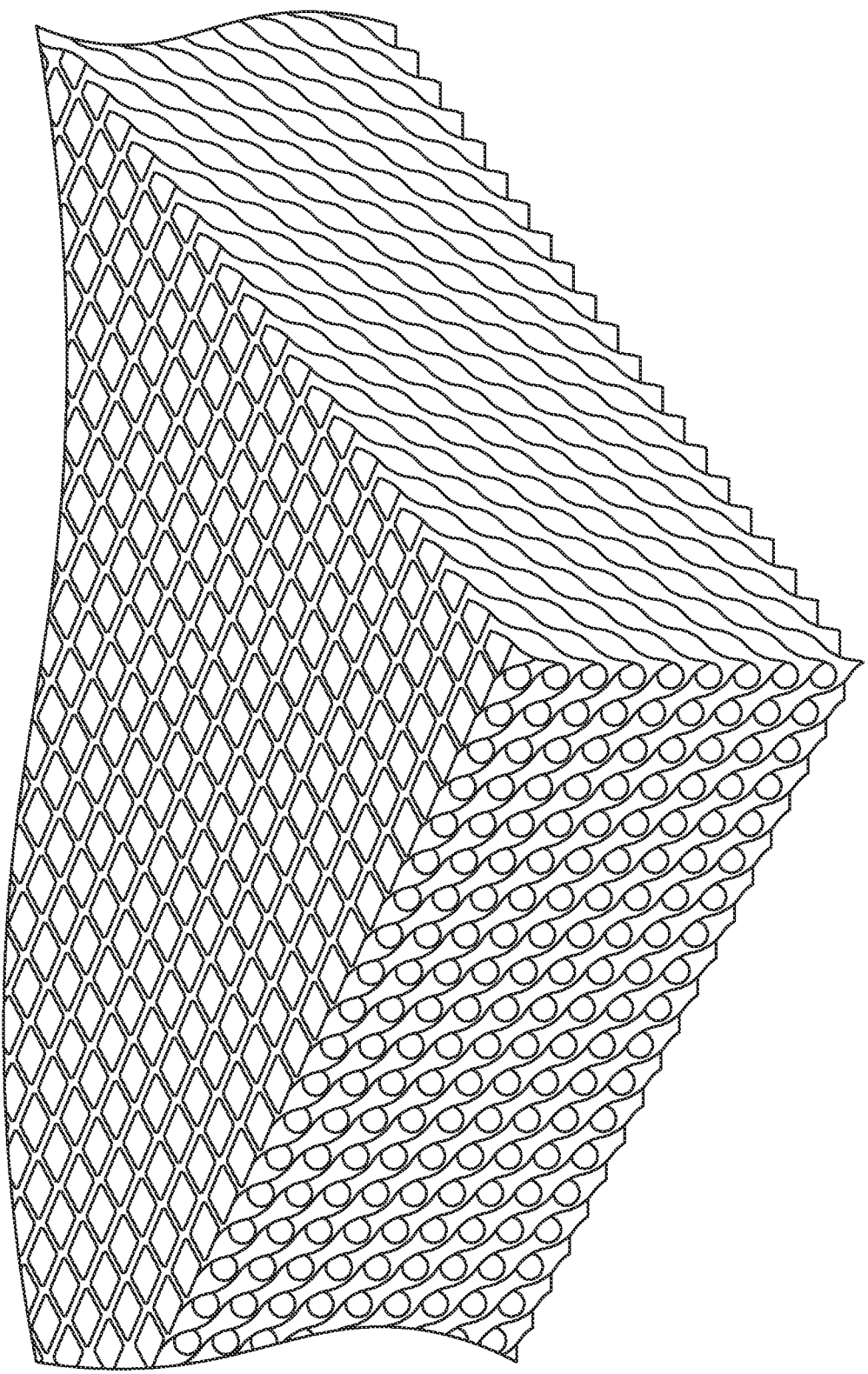
FIG. 5 is a perspective view of the matrix having a split pea TPMS structure.

FIG. 3 is a perspective view of the matrix 110 having a gyroid TPMS structure, FIG. 4 is a perspective view of the matrix 110 having an orthogonal hole TPMS structure, and FIG. 5 is a perspective view of the matrix 110 having a split pea TPMS structure. It is noted however, that the TPMS structures depicted in FIGS. 1 through 5 are illustrative examples only and are not intended to be in any way limiting.

Figure 6:
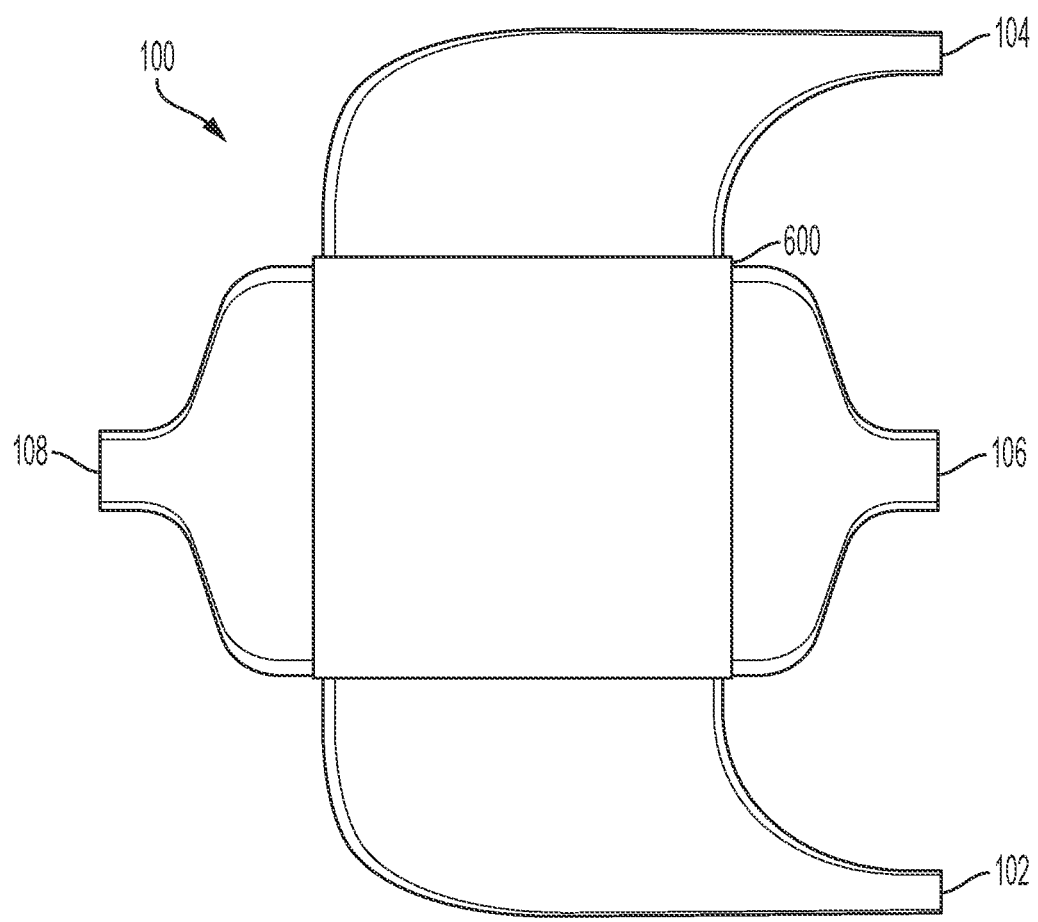
FIG. 6 is a top-down perspective view of the heat exchange catalyst unit that utilizes a TPMS structure.

FIG. 6 is a top-down perspective view of the heat exchange catalyst unit 100 that utilizes a TPMS structure. In an embodiment, the heat exchange catalyst unit 100 can be manufactured via welding the inlets 102, 106 and outlets 104, 108 to a housing 600. In an embodiment, the housing 600 can include a cover (not depicted in FIG. 6) which can be removed in order to service or replace the matrix 110. In another embodiment, the inlets 102, 106 and/or the outlets 104, 108 can be removably attached to the housing 600 so that different inlets and outlets having various dimensions, sizes, and flow properties can be utilized with the housing 600 in a modular fashion.

Figure 7:
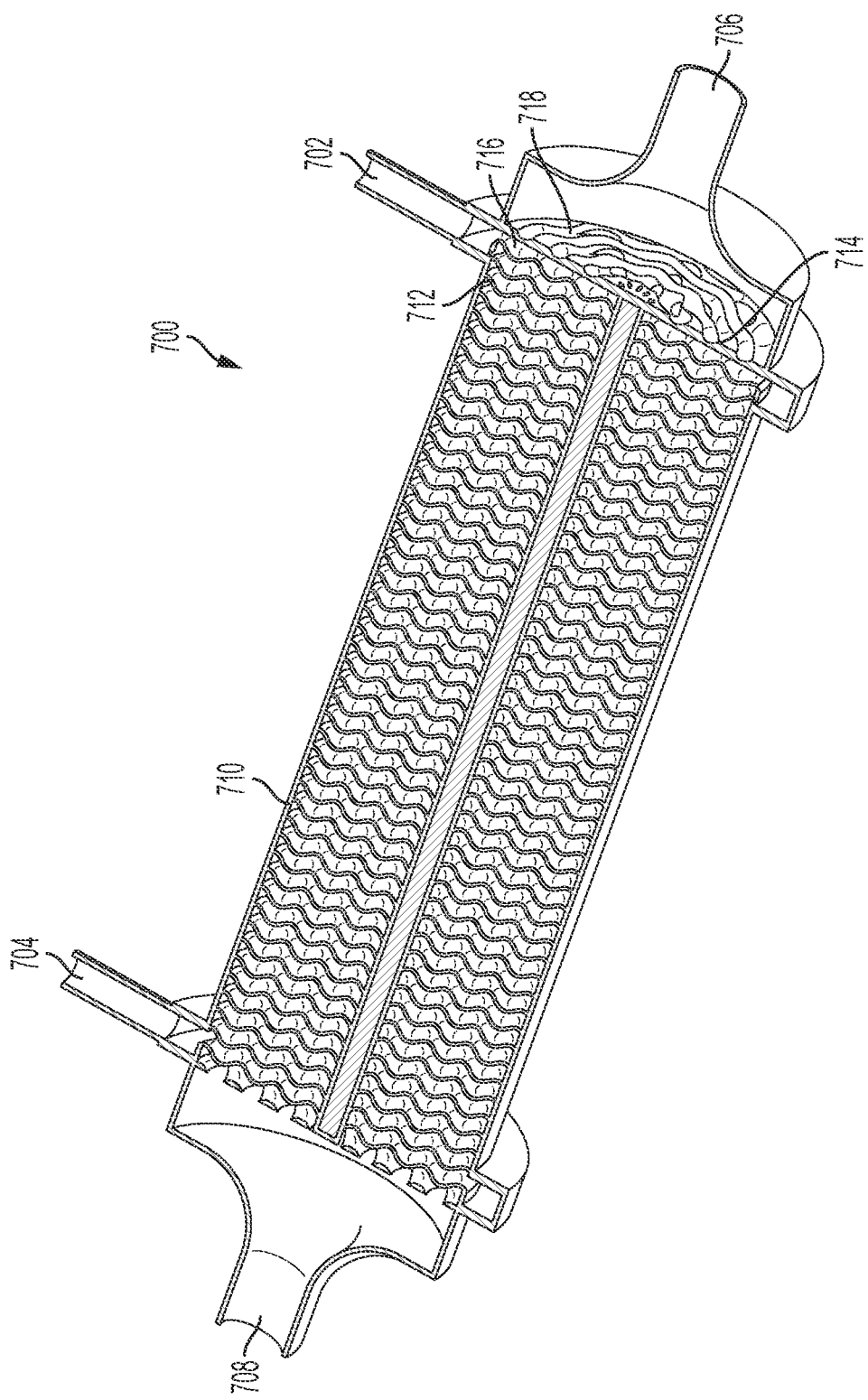
FIG. 7 is a front cross-sectional view of a cylindrical heat exchange catalyst unit that utilizes a TPMS structure.

FIG. 7 is a front cross-sectional view of a cylindrical heat exchange catalyst unit 700 that utilizes a TPMS structure. Similar to the heat exchange catalyst unit 100 shown in FIG. 1, the cylindrical heat exchange catalyst unit 700 is metallic and made from a nickel alloy, and in a preferred embodiment, the cylindrical heat exchange catalyst unit 700 is made from Inconel® 625.

In an embodiment, the cylindrical heat exchange catalyst unit 700 includes an ammonia inlet 702, a hydrogen outlet 704, a heated exhaust gas inlet 706, and an exhaust gas outlet 708. Positioned between the inlets 702, 706 and outlets 704, 708 is a matrix 710. The matrix 710 is formed from width-wise surfaces 712 and length-wise surfaces 714 which run generally perpendicular to each other. The surfaces 712, 714 of the matrix 710 create passages allowing the gaseous ammonia and heated exhaust gas to flow; these passages are indicated by the ammonia channels 716 and heated exhaust gas channels 718.

Gaseous ammonia is supplied to cylindrical heat exchange catalyst unit 700 via inlet 702, while heated exhaust gas is concurrently supplied to inlet 706. The gaseous ammonia traverses the matrix 710 axially, while the heated exhaust gas traverses the matrix laterally.

As shown in FIG. 7, the matrix 710 physically separates the gases passing through each of the channels 716, 718, thereby providing an exceptionally large surface area throughout the matrix 710 where the heated exhaust gas exchanges its heat with the gaseous ammonia. In an embodiment, the surfaces 712, 714 of the matrix 710 are coated with a catalyst that facilitates the cracking of ammonia into constituent hydrogen and nitrogen components. In this embodiment, the surfaces 712, 714 of the matrix 710 are coated with the catalyst using a washcoating or deposition technique to bind or adhere the catalyst to the surfaces 712, 714.

In another embodiment, catalyst in the form of discrete catalyst media is deposited into the passages forming the ammonia channels 716 and heated exhaust gas channels 718.

In yet another embodiment, the surfaces 712, 714 of the matrix 710 can be coated with a catalyst as described herein, and additional discrete catalyst media can be deposited into the passages forming the ammonia channels 716 and heated exhaust gas channels 718.

Figure 8:
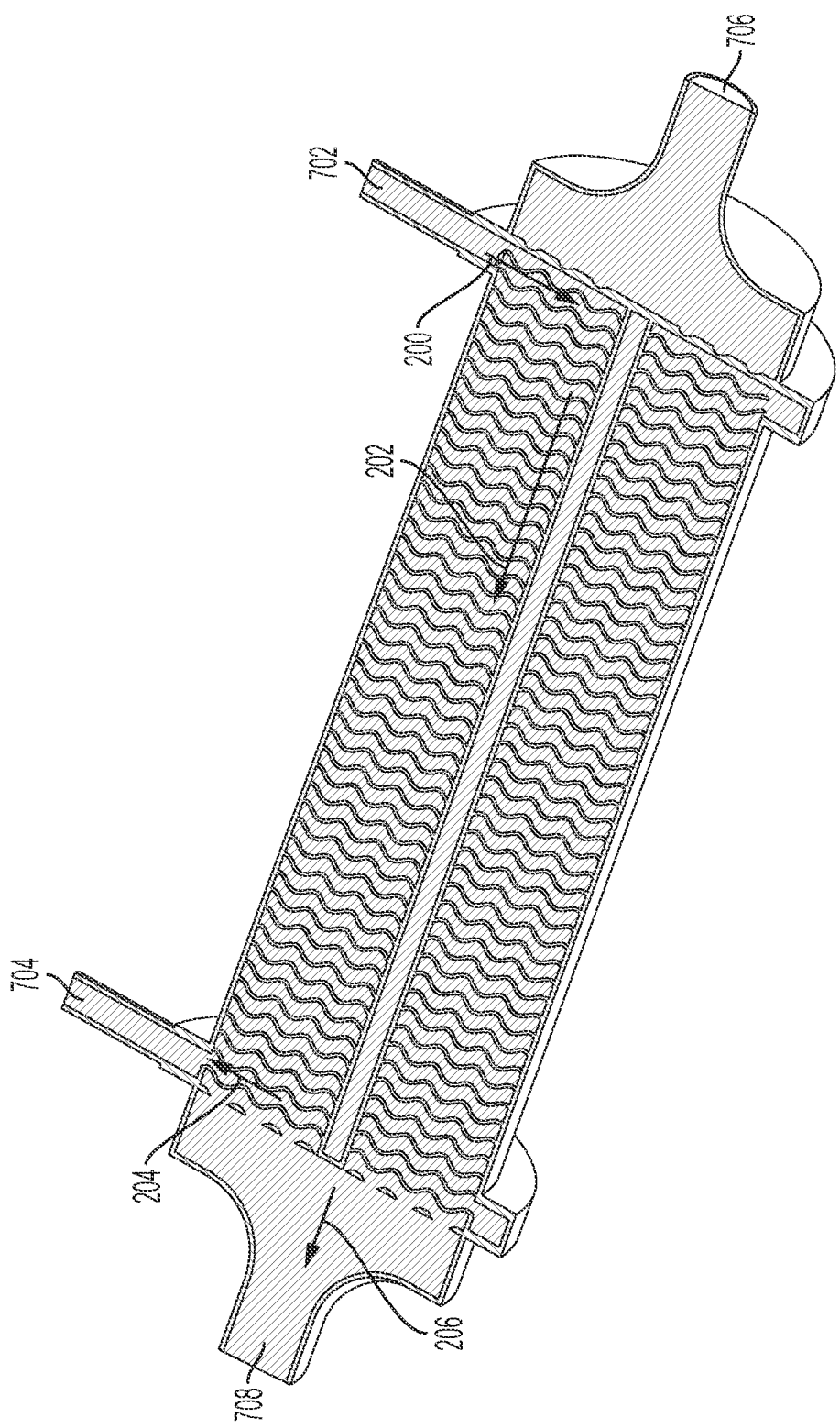
FIG. 8 is a front cross-sectional view of the cylindrical heat exchange catalyst unit that utilizes a TPMS structure which depicts the flow of heated exhaust gas and gaseous ammonia through the matrix.

FIG. 8 is a front cross-sectional view of the cylindrical heat exchange catalyst unit 700 that utilizes a TPMS structure which depicts the flow of heated exhaust gas and gaseous ammonia through the matrix. In operation, gaseous ammonia 200 is supplied to the inlet 702 and flows through the ammonia channels 716, while heated exhaust gas 202 is concurrently supplied to the inlet 706 and flows through the heated gas channels 718. The heated exhaust gas 202 heats the catalyst, resulting in cracking of the ammonia 200 into constituent hydrogen and nitrogen components 204. The resulting hydrogen and nitrogen components 204 exit the heat exchange catalyst unit 700 via the outlet 704 and are supplied to the downstream injection system for the engine, while residual exhaust gas 206 exits the heat exchange catalyst unit via the outlet 708.

Figure 9:
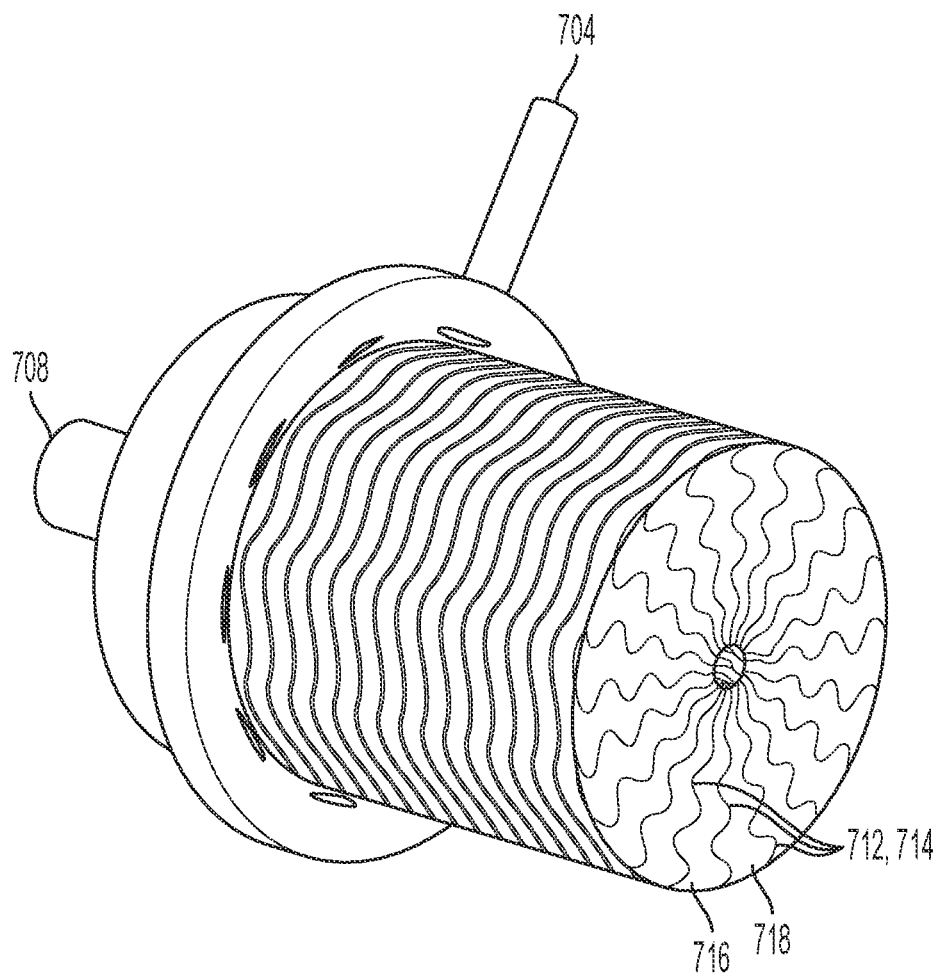
FIG. 9 is a side cross-sectional view of the cylindrical heat exchange catalyst unit that utilizes a TPMS structure which depicts the flow of heated exhaust gas and gaseous ammonia through the matrix.

FIG. 9 is a side cross-sectional view of the cylindrical heat exchange catalyst unit 700 that utilizes a TPMS structure which depicts the flow of heated exhaust gas and gaseous ammonia through the matrix. As shown in FIG. 9, the surfaces 712, 714 of the matrix 710 creates ammonia channels 716 and heated exhaust gas channels 718. The cylindrical design can provide efficiencies for mass production, given the rounded parts, fewer welded seams/joints compared to square and rectangular designs, and less susceptibility to thermal stress.

It is noted that cylindrical shape of the cylindrical heat exchange catalyst unit 700 is an illustrative example only and is not intended to be in any way limiting. In other embodiments, the heat exchange catalyst unit 700 can be any polygonal shape, such as, for example, oval, oblong, triangular, square, kite-shaped, trapezoid, parallelogram, rhombus, and the like, as well as various 3D shapes such as, for example, cube, cuboid, sphere, cone, and the like.

Figure 10:
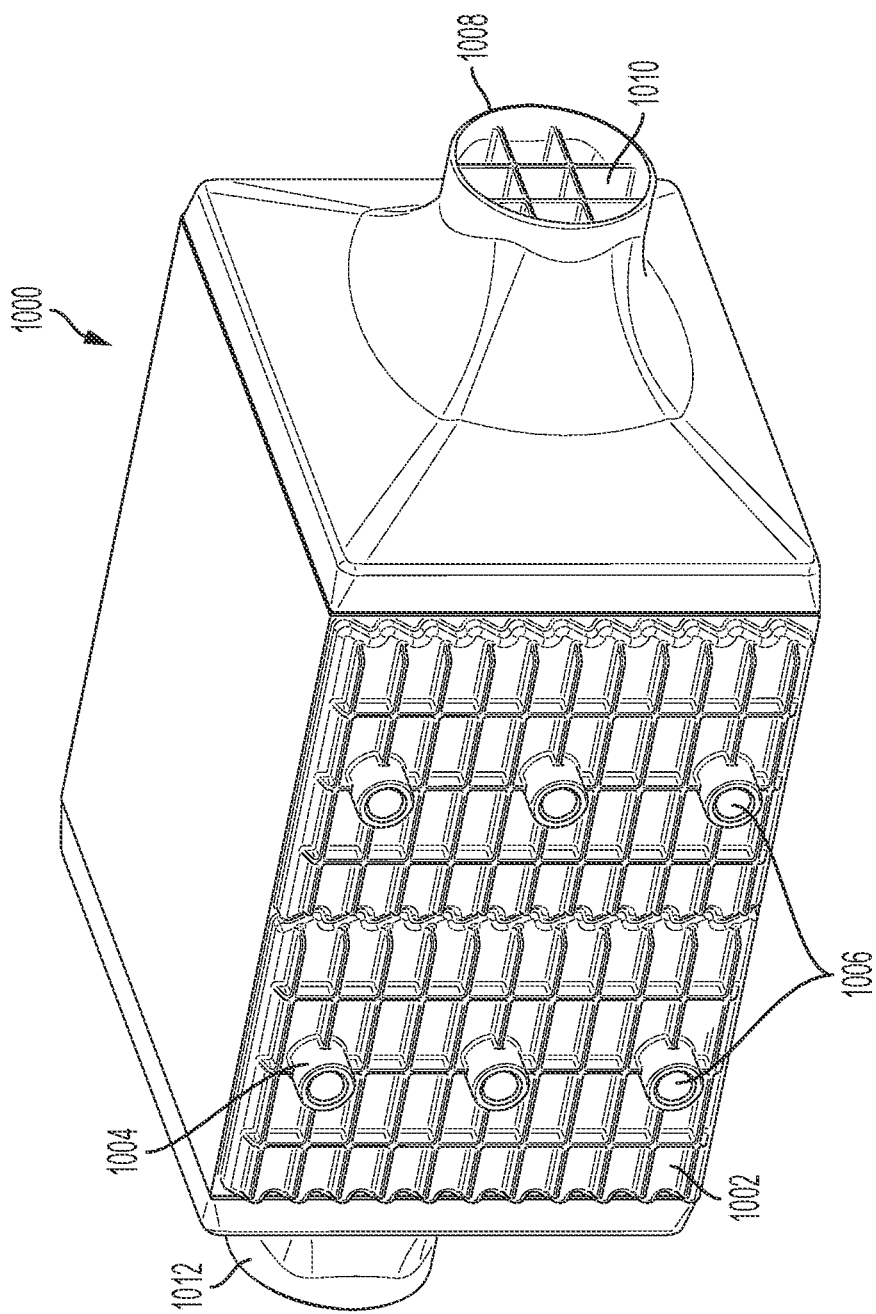
FIG. 10 is a perspective view of a heat exchange catalyst unit that utilizes a tube bundle structure.

FIG. 10 is a perspective view of a heat exchange catalyst unit 1000 that utilizes a tube bundle structure, and which serves as a heat exchanger as well as a catalytic converter that performs ammonia cracking. The heat exchange catalyst unit 1000 is metallic, and in an embodiment, includes a sidewall 1002 that includes a gaseous ammonia inlet 1004. In an embodiment, the inlet sidewall 1002 can include additional ports 1006 that may be used for a variety of functions. For example, the ports 1006 may serve an inlets, or may be coupled to equipment for temperature, throughput, and/or pressure sensing.

The heat exchange catalyst unit 1000 further includes a heated gas inlet 1008. In an embodiment, the heated exhaust gas inlet 1008 includes a divider 1010 which spreads the heated exhaust gas from the engine evenly over the internal tube bundle structure contained within the heat exchange catalyst unit 1000, as described in more detail with reference to FIG. 11. In an embodiment, the divider 1010 can have a grid or lattice structure.

The heat exchange catalyst unit 1000 includes an exhaust gas outlet 1012 positioned opposite the heated gas inlet 1008.

Figure 11:
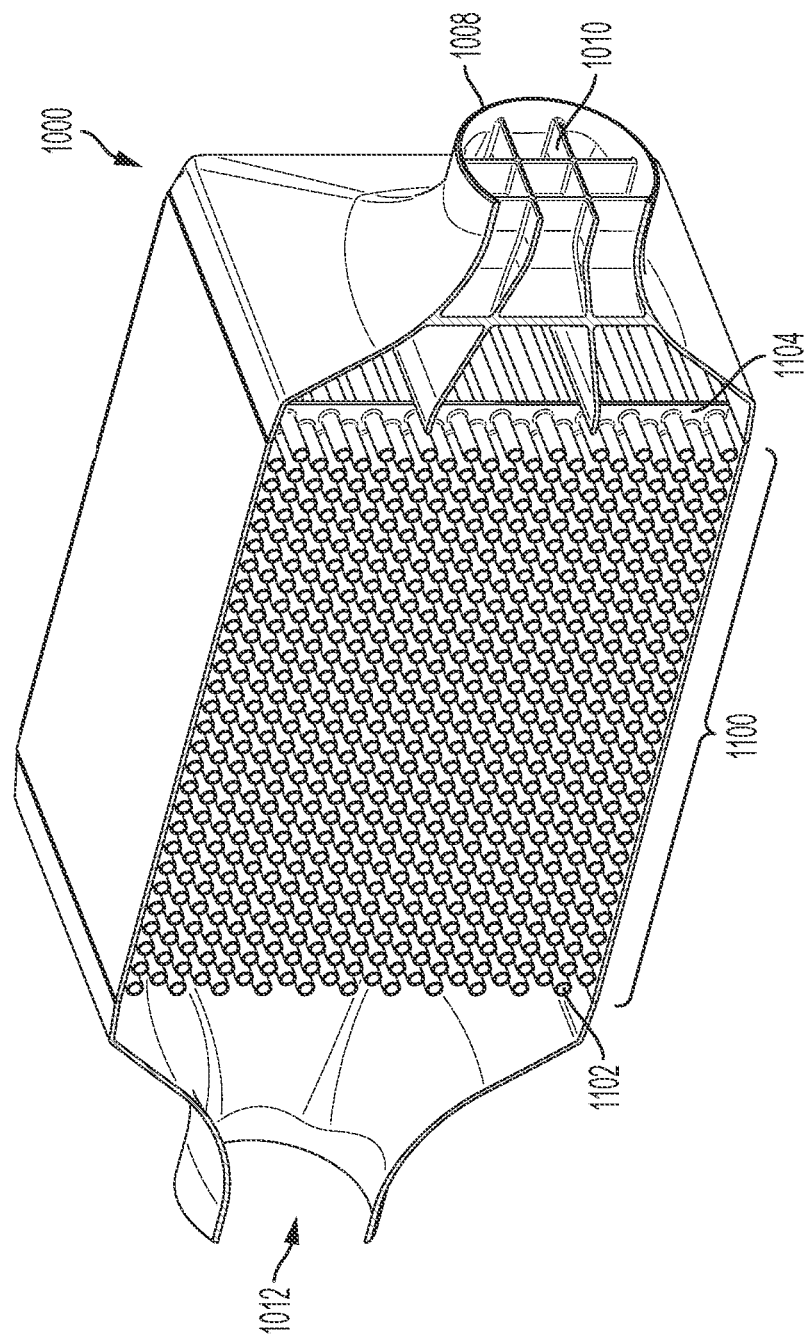
FIG. 11 is a front cross-sectional view of the heat exchange catalyst unit that utilizes a tube bundle structure.

FIG. 11 is a front cross-sectional view of the heat exchange catalyst unit 1000 that utilizes a tube bundle structure. In an embodiment, a tube bundle structure 1100 is disposed within the heat exchange catalyst unit 1000. The tube bundle structure 1100 is comprised of individual tubes 1102 which extend along the width of the heat exchange catalyst unit 1000 from the sidewall 1002, perpendicular to the inlet 1008 and outlet 1012.

In an embodiment, the tube bundle structure 1100 includes rows and/or columns of tubes 1102 arranged in an offset fashion so that each adjacent row and/or column includes tubes which are offset from its neighboring tubes. This pattern maximizes the surface area contacted by the heated exhaust gas as the gas traverses the tube bundle structure 1100, thereby maximizing the amount of catalyst heated in order to facilitate the cracking process.

In an embodiment, the heat exchange catalyst unit 1000 includes at least one support structure 1104 which facilitates the 3D printing process, and further provide stability against thermal stress during operation of the heat exchange catalyst unit 1000.

Gaseous ammonia is supplied to the heat exchange catalyst unit 1000 via inlet 1004, while heated exhaust gas concurrently is supplied to the inlet 1008. The gaseous ammonia traverses the lateral spaces between the tubes 1102, while the heated exhaust gas traverses the axial space inside the tubes 1102.

In an embodiment, the spaces between the tubes 1102 are filled with a catalyst in the form of a discrete catalyst media. In another embodiment, the tubes 1102 themselves are hollow and are also filled with the discrete catalyst media.

In yet another embodiment, the external surfaces and/or the internal surfaces of the tubes 1102 are also coated with the catalyst using a washcoating or deposition technique to bind or adhere the catalyst to the surfaces.

Figure 12:
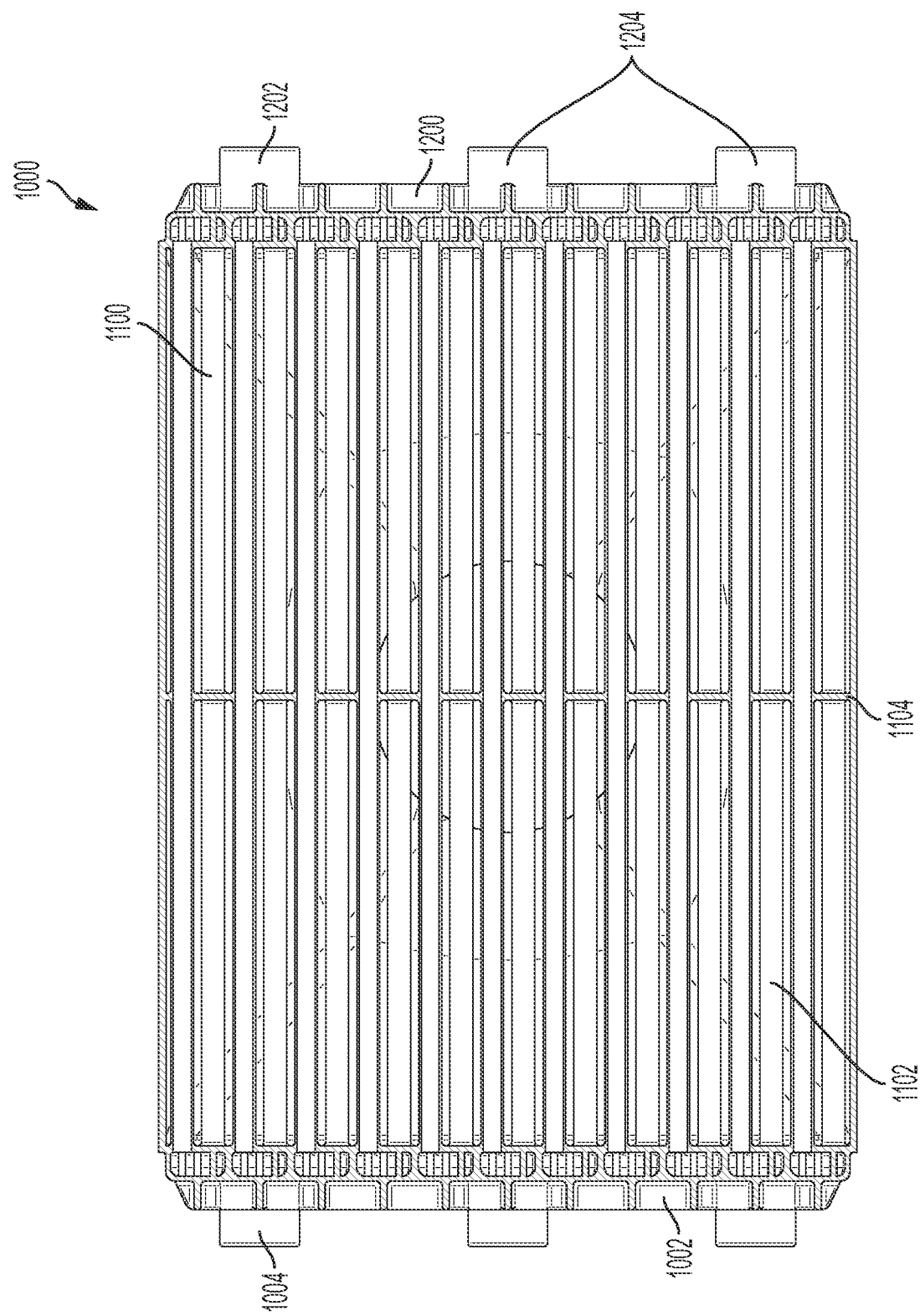
FIG. 12 is a side cross-sectional view of the heat exchange catalyst unit that utilizes a tube bundle structure.

FIG. 12 is a side cross-sectional view of the heat exchange catalyst unit 1000 that utilizes a tube bundle structure 1100. In an embodiment, the heat exchange catalyst unit 1000 includes a sidewall 1200 positioned opposite the sidewall 1002. The sidewall 1200 includes a hydrogen outlet 1202, and can include additional ports 1204 that may be used for a variety of functions. For example, the ports 1204 may serve as outlets, or may be coupled to equipment for temperature, throughput, and/or pressure sensing.

In operation, gaseous ammonia is supplied to the inlet 1004, while heated exhaust gas is concurrently supplied to the inlet 1008. The heated exhaust gas heats the catalyst, resulting in cracking of the ammonia into constituent hydrogen and nitrogen components. The resulting hydrogen and nitrogen components exit the heat exchange catalyst unit 1000 via the outlet 1202 and are supplied to the downstream engine.

In an embodiment, the heat exchange catalyst unit 1000 is made from a nickel alloy. In a preferred embodiment, the heat exchange catalyst unit 1000 is made from Inconel® 625.

In an embodiment, the sidewalls 1002, 1200, the gaseous ammonia inlet 1004, the hydrogen outlet 1202, the heated exhaust gas inlet 1008, the divider 1010, the exhaust gas outlet 1012, and the support structures 1104 can be made from the same metallic material as the heat exchange catalyst unit 1000. In another embodiment, the sidewalls 1002, 1200, the gaseous ammonia inlet 1004, the divider 1010, the hydrogen outlet 1202, the heated exhaust gas inlet 1008, and the exhaust gas outlet 1012 can be made from stainless steel, silver, bronze, and comparable alloys.

In an embodiment, the heat exchange catalyst unit 1000 includes a plate heat exchanger. The plate heat exchanger consists of a series of parallel metallic plates that are placed adjacent to one another, thereby forming a series of channels for the respective fluids (i.e., gaseous ammonia and heated exhaust gas) to flow between the plates. The space between two adjacent plates forms a channel in which a respective fluid flows. Heat transfer occurs when the gaseous ammonia flows in one channel, and heated exhaust flows in an adjacent channel, where a common metallic plate separates the two adjacent channels.

Inlet and outlet holes on each of the metallic plates allow the gaseous ammonia and heated exhaust gas to flow through respective adjacent channels, such that a metallic plate is always in contact on one side with gaseous ammonia, and on the other side with heated exhaust gas.

A plate heat exchanger is advantageous as it allows the gaseous ammonia and heated exhaust gas to be spread across multiple plates, thereby exposing the fluids to a large heat transfer surface area.

In an embodiment, the plate heat exchanger utilizes counter-current flow, where the gaseous ammonia flows in one direction in its respective channel, and heated exhaust gas flows in an opposite direction in its respective adjacent channel.

In another embodiment, the plate heat exchanger utilizes parallel flow, where the gaseous ammonia and heated exhaust gas each flow in the same direction in their respective adjacent channels.

In an embodiment, the surfaces of the metallic plates can be corrugated in order to increase the turbulence in the gaseous ammonia and heated exhaust gas as these fluids flow through the plate heat exchanger. This turbulence provides an effective heat transfer coefficient.

In an embodiment, the surfaces of the metallic plates are coated with a catalyst. In another embodiment, the channels where the gaseous ammonia flows are filled with a catalyst, such as discrete catalyst media. In yet another embodiment, the channels where gaseous ammonia flows are filled with a catalyst, and the surfaces of the metallic plates facing these channels where gaseous ammonia flows are also coated with a catalyst.

Figure 13:
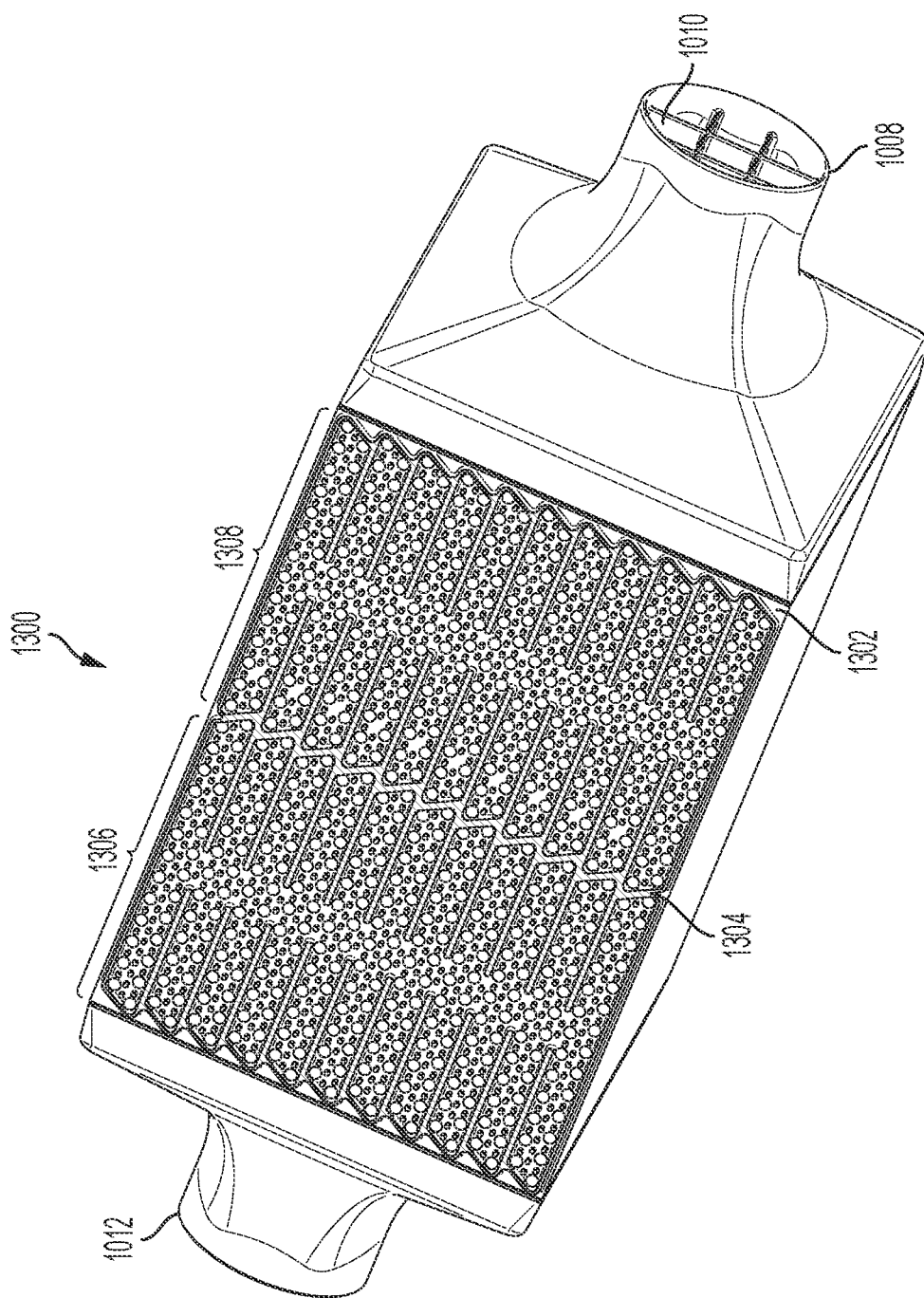
FIG. 13 is a front cross-sectional view of a two-pass heat exchange catalyst unit that utilizes a tube bundle structure.

FIG. 13 is a front cross-sectional view of a two-pass heat exchange catalyst unit 1300 that utilizes a tube bundle structure 1100. In this embodiment, the support structure 1302 includes a fascia that receives a sidewall (not depicted in FIG. 13). The support structure 1302 includes a divider 1304 which physically separates the tube bundle structure 1100 into a left section 1306 and right section 1308. The divider 1304 extends along the width of the two-pass heat exchange catalyst unit 1300 between the two sidewalls. In this embodiment, a gaseous ammonia inlet is positioned on a sidewall covering the left section 1306, and a hydrogen outlet is positioned on a sidewall covering the right section 1308.

In operation, gaseous ammonia is supplied to the gaseous ammonia inlet, while heated exhaust gas is concurrently supplied to the inlet 1008. As the ammonia traverses the left section 1306 of tube bundle structure 1100, heated exhaust gas heats the catalyst, resulting in cracking of the ammonia into constituent hydrogen and nitrogen components. The remaining ammonia traverses back through the right section 1308 of the tube bundle structure 1100 and continues to undergo cracking, thereby providing a two-pass cracking process. The resulting hydrogen and nitrogen components exit the two-pass heat exchange catalyst unit 1300 via the hydrogen outlet and are supplied to the downstream engine.

Figure 14:
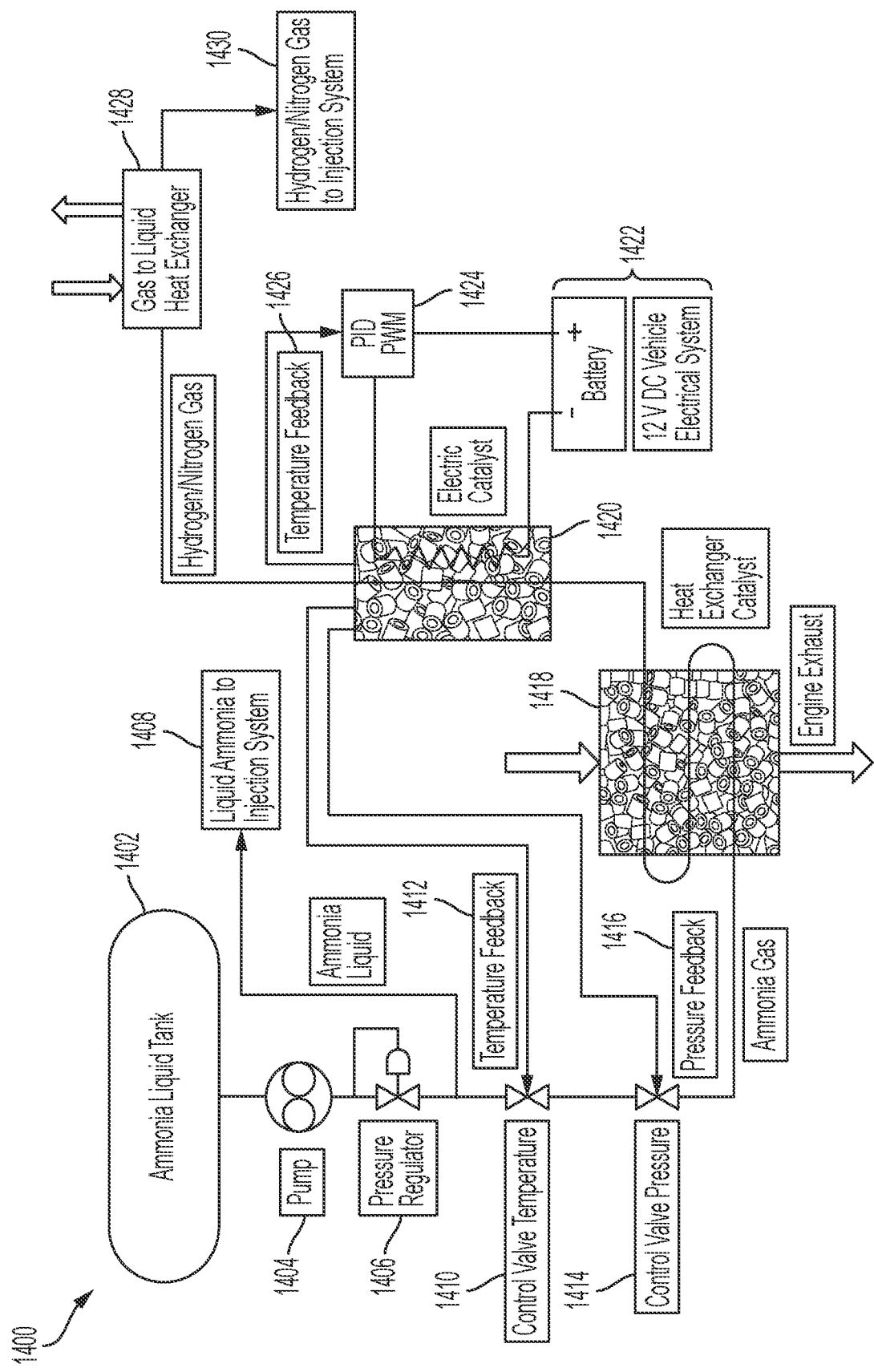
FIG. 14 is a block diagram of an on-board ammonia cracking system for an internal combustion engine.

FIG. 14 is a block diagram of an on-board ammonia cracking system for an internal combustion engine. The on-board ammonia cracking system 1400 provides a mechanism to generate hydrogen from ammonia which eliminates the need for a separate hydrogen tank to be carried by the motor vehicle.

Referring FIG. 14, an ammonia liquid tank 1402 is mounted to a motor vehicle or engine, and in an embodiment, the ammonia liquid tank 1402 can be coupled to a pump 1404. In an embodiment, the tank 1402 is refillable and/or replaceable. The pump 1404 can be coupled to a port on the tank 1402 to facilitate the delivery of ammonia from the tank 1402. For example, in a cold environment where the temperature is approximately 0° C. or less, the vapor pressure of ammonia is not adequate to push itself out of the tank 1402. Thus, the pump 1404 is required to draw or force the ammonia out of the tank 1402.

In another embodiment, an electrical heater (not depicted in FIG. 14) can be coupled to the tank 1402, such as within the tank 1402 or on an outer surface of the tank 1402, in order to heat the liquid ammonia contained within the tank 1402 to a temperature where it vaporizes into a gaseous form.

In an embodiment, a pressure regulator 1406 is coupled to an outlet of the tank 1402, and serves to control the volume and/or flow rate of ammonia drawn out of the tank 1402 by the pump 1404. The pressure regulator 1406 monitors the pressure of the liquid ammonia in the tank 1402. Once the pressure lowers to a threshold pressure value whereby the liquid ammonia can vaporize into a gaseous form, the pressure regulator 1406 opens and feeds gaseous ammonia downstream. Any residual liquid ammonia that passes through the pressure regulator 1406 is fed to an injection system 1408 (via, for example, a T-coupling on a supply line).

In an embodiment, a temperature control valve 1410 receives a temperature feedback signal 1412 that contains a temperature reading from an electric catalyst unit 1420 during a cold start of the engine. The temperature feedback signal 1412 can be generated by a temperature sensor coupled to the electric catalyst unit 1420. Once the electric catalyst unit 1420 reaches a threshold temperature (i.e., the temperature reading is equal to or greater than the threshold temperature) suitable to perform the ammonia cracking process, the temperature control valve 1410 opens and the gaseous ammonia passes through the heat exchange catalyst unit 1418, and travels downstream to the electric catalyst unit 1420, which is heated using power supplied from the vehicle power system 1422.

If the electric catalyst unit 1420 has not reached the threshold temperature, then the temperature control valve 1410 continues to monitor the temperature feedback signal 1412, and prevents the downstream travel of the gaseous ammonia. The cold start operation is described in more detail herein.

In an embodiment, the temperature of the heated exhaust gas entering the heat exchange catalyst unit 1418 is judged based on the current draw in the electric catalyst unit 1420, where the current draw is indicative of how effective the heat exchange catalyst unit 1418 is in cracking the gaseous ammonia.

For example, if there is hydrogen and nitrogen passing from the heat exchange catalyst unit 1418 to the electric catalyst unit 1420, the electric catalyst unit 1420 will not perform the ammonia cracking process, and thus will draw minimal or no current.

If, however, gaseous ammonia passes from the heat exchange catalyst unit 1418 to electric catalyst unit 1420, the ammonia cracking process will occur, drawing current in order to heat the heating element disposed within the electric catalyst unit 1420.

However, during a normal or high load operating conditions of the engine (i.e., not during a cold start or low load operating conditions), the on-board ammonia cracking system 1400 does not utilize the electric catalyst unit 1420 to perform the ammonia cracking process, and the heat exchange catalyst unit 1418 performs the ammonia cracking process as it will have been heated to the threshold temperature by the heated exhaust gas from the engine.

The heat exchange catalyst unit 1418 referred to in FIG. 14 can be any of the embodiments described herein—the heat exchange catalyst unit 100 that utilizes a TPMS structure, the cylindrical heat exchange catalyst unit 700 that utilizes a TPMS structure, the heat exchange catalyst unit 1000 that utilizes a tube bundle structure, or the two-pass heat exchange catalyst unit 1300 that utilizes a tube bundle structure.

The pressure control valve 1414 is located in series with the temperature control valve 1410, and controls the amount of gaseous ammonia which is fed into the heat exchange catalyst unit 1418.

In an embodiment, the pressure control valve 1414 receives a pressure feedback signal 1416 from the heat exchange catalyst unit 1418. For example, the heat exchange catalyst unit 1418 can be coupled to a pressure transducer or the like (not depicted in FIG. 14) that generates the pressure feedback signal 1416.

In an embodiment, to facilitate a cold start of the on-board ammonia cracking system 1400 when the exhaust gas from the engine is not at a threshold temperature suitable to perform the ammonia cracking process, the electric catalyst unit 1420 is used to heat the catalyst so that the gaseous ammonia can be cracked, and the resulting hydrogen is to be supplied to the downstream injection system for the engine. The engine can then burn the hydrogen, powering the engine which results in heated exhaust gas being supplied to the on-board ammonia cracking system 1400.

In an embodiment, the electric catalyst unit 1420 is coupled to the vehicle power system 1422, such as a traditional vehicle battery. In another embodiment, the electric catalyst unit 1420 can be heated via a supplemental heating/electric source, such as a renewable energy source, a portable battery source, an on-board electric battery pack, and/or a rechargeable battery.

In addition to facilitating a cold start of the on-board ammonia cracking system 1400, the electric catalyst unit 1420 is utilized to supplement the heat exchange catalyst unit 1418 during low load operating conditions of the engine, such as when the vehicle is stopped, moving slowly, or idling. For example, during low load operating conditions, the engine exhaust gas temperature can drop significantly. The reduced temperature of the exhaust gas flowing into the heat exchange catalyst unit 1418 during such low load operating conditions may not be sufficient for the catalyst to crack the ammonia. In an embodiment, depending on the specific catalyst that is utilized, the temperature of the exhaust gas needs to be at least 400° C. to 700° C. in order to perform the ammonia cracking process, and in a preferred embodiment, the temperature of the exhaust gas is at least 600° C. in order to perform the ammonia cracking process.

In this scenario, the cold gaseous ammonia will pass through the heat exchange catalyst unit 1418, and will be supplied downstream to the electric catalyst unit 1420, which is heated using power supplied from the vehicle power system 1422. Once the electric catalyst unit 1420 is heated to a threshold temperature suitable to perform the ammonia cracking process, the temperature control valve 1410 opens and allows the gaseous ammonia to be fed to the heat exchange catalyst unit 1418 and ultimately to the electric catalyst unit 1420. The electric catalyst unit 1420 then performs the ammonia cracking process, and the resulting hydrogen is supplied to the downstream injection system for the engine.

When the exhaust gas flowing into the heat exchange catalyst unit 1418 reaches a threshold temperature suitable to perform the ammonia cracking process, such as during normal or high load operating conditions of the engine, the ammonia cracking process occurs within the heat exchange catalyst unit 1418. The resulting hydrogen and nitrogen will pass downstream through the electric catalyst unit 1420, and further downstream to a gas-to-liquid or gas-to-gas heat exchange unit 1428, and subsequently to the injection system 1430 for the engine. In an embodiment, the gas-to-liquid or gas-to-gas heat exchange unit 1428 may leverage engine coolant and/or the engine radiator, or input ammonia gas or liquid, to facilitate the heat exchange process.

In an embodiment, the pressure regulator 1406 can be controlled with an electric servomotor to provide a steady flow of gaseous ammonia from the tank 1402. In another embodiment, a pulse-width modulated injection valve can be used. The servomotor and/or pulse generators can be controlled using an electronic controller, such as an industrial PID controller (not depicted in FIG. 14).

In an embodiment, the electronic controller can be coupled to various components of the on-board ammonia cracking system 1400 to receive inputs from the pressure regulator 1406, the temperature control valve 1410, pressure control valve 1414, as well as from sensors such as temperature sensors and pressure transducers which may be coupled to the heat-exchange catalyst unit 1418 and/or electric catalyst unit 1420.

In another embodiment, the electronic controller can be integrated into the hardware and software with the vehicle's electronic control unit (ECU). In this embodiment, the flow rate of hydrogen fed to the injection system of the engine can be measured and reported back to the ECU as a mechanism to control the injection strategy.

Figure 15:
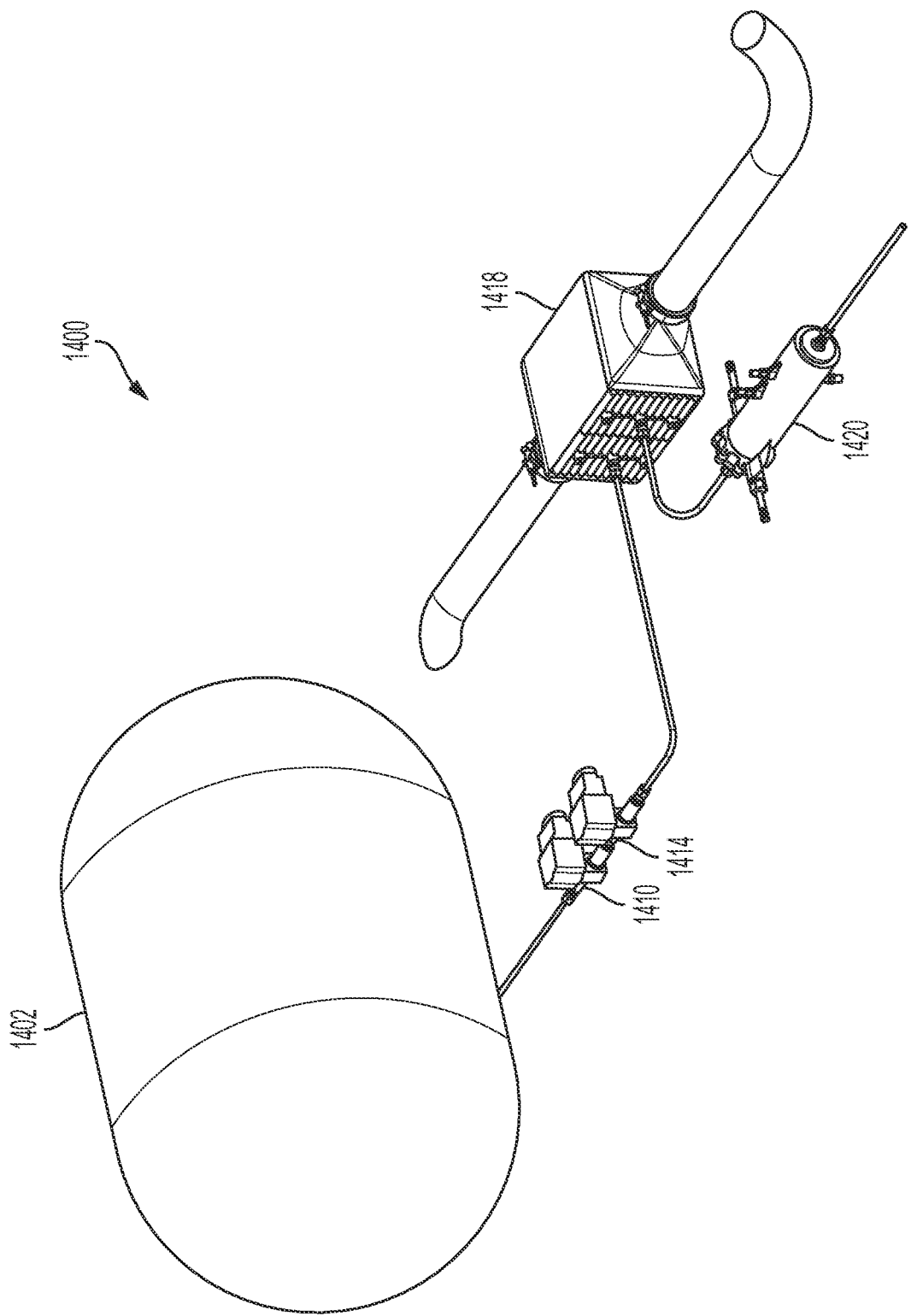
FIG. 15 is a perspective view of an on-board ammonia cracking system for an internal combustion engine.
Figure 16:
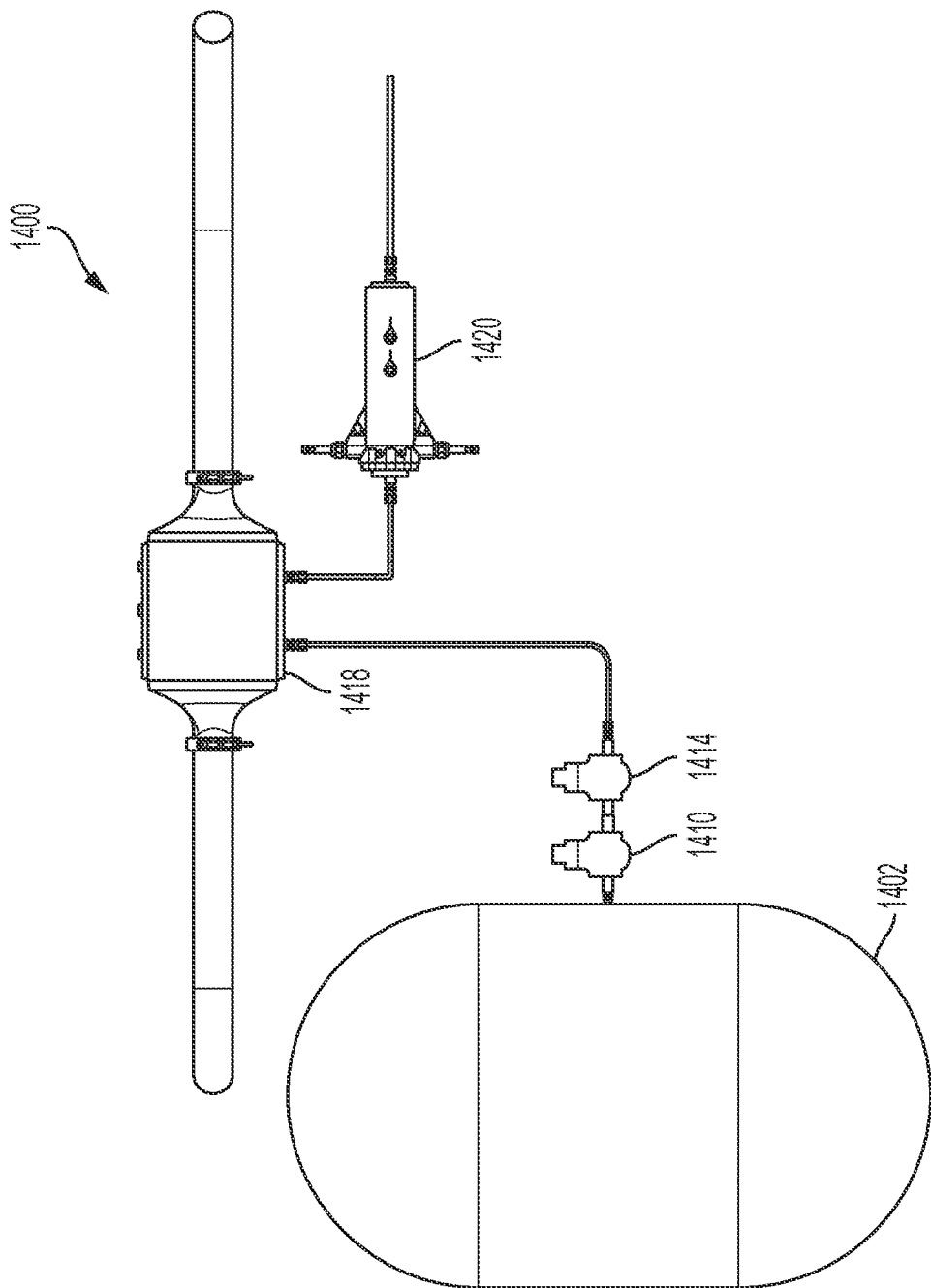
FIG. 16 is a top-down perspective view of the on-board ammonia cracking system.
Figure 17:
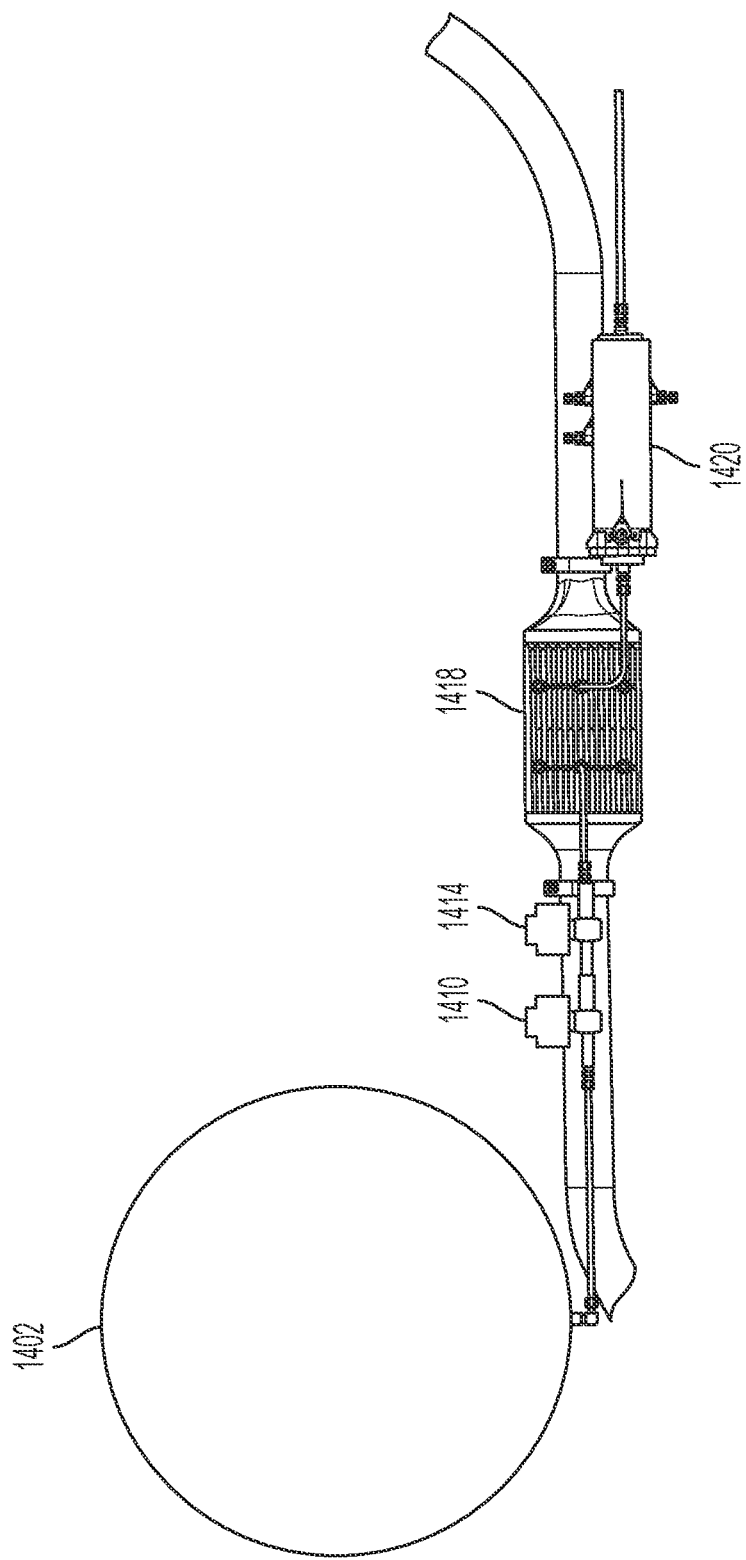
FIG. 17 is a perspective side view of the on-board ammonia cracking system.

FIGS. 15-17 are various perspective views of the on-board ammonia cracking system 1400 for an internal combustion engine described in FIG. 14.

Figure 18:
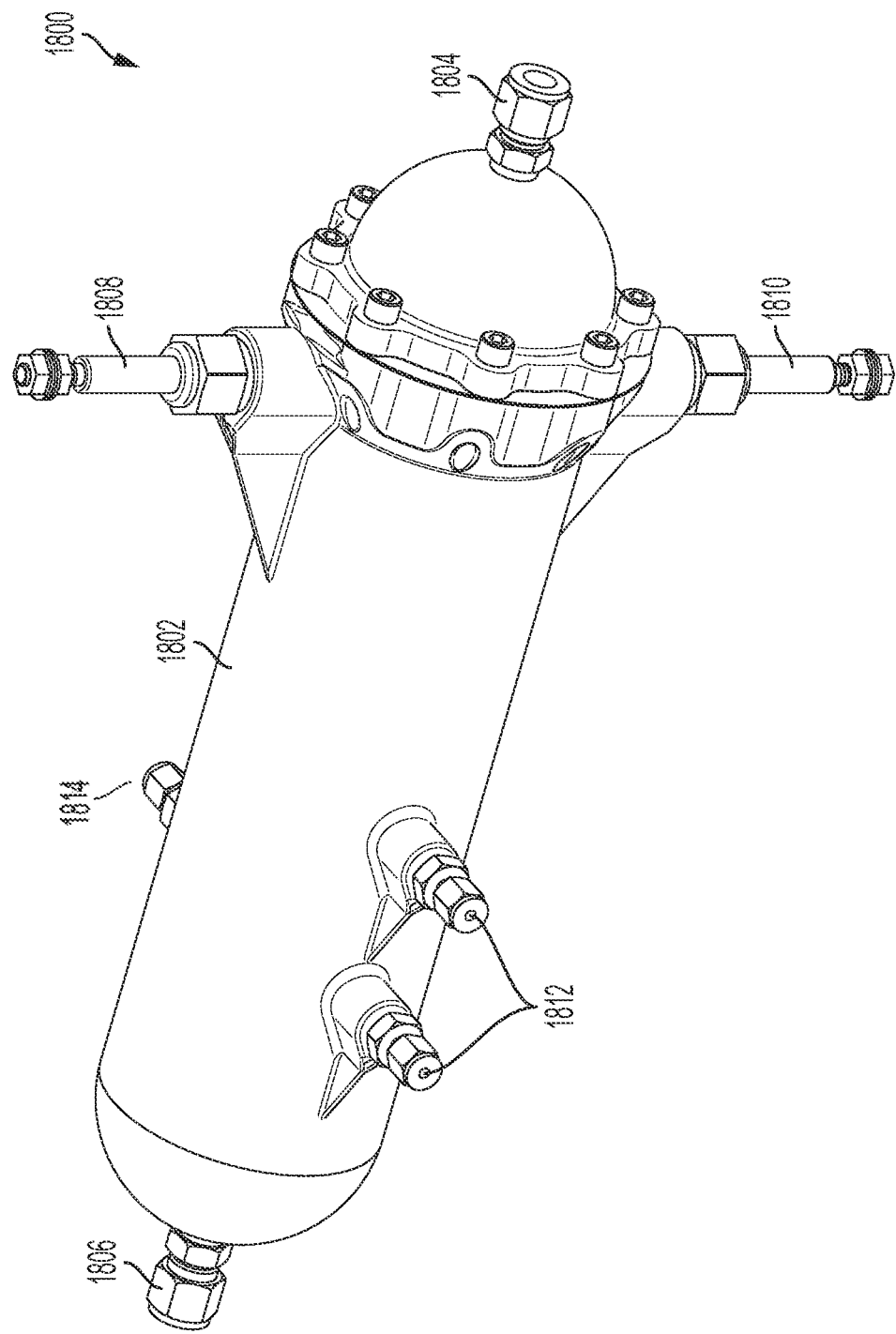
FIG. 18 is a perspective view of an electric catalyst unit.

FIG. 18 is a perspective view of an electric catalyst unit. In an embodiment, the electric catalyst unit 1800 comprises a housing 1802 which encloses a ceramic tube 1900 (depicted in FIG. 19). In an embodiment, the housing 1802 is a metal housing.

In an embodiment, the electric catalyst unit 1800 includes a gaseous ammonia inlet 1804 and a hydrogen outlet 1806 disposed on the opposite end of the electric catalyst unit 1800. The electric catalyst unit further includes power feed-throughs 1808, 1810 for the heating element 1904 (depicted in FIG. 19). In an embodiment, the electric catalyst unit 1800 can include radial fittings 1812, 1814 that may be used for a variety of functions. For example, the radial fittings 1812, 1814 may serve an inlets, outlets, or may be coupled to equipment for temperature, throughput, and/or pressure sensing. In an embodiment, the radial fittings 1812 can each include, or be coupled to, thermocouples, and the radial fitting 1814 can include, or be coupled to, a pressure transducer.

Figure 19:
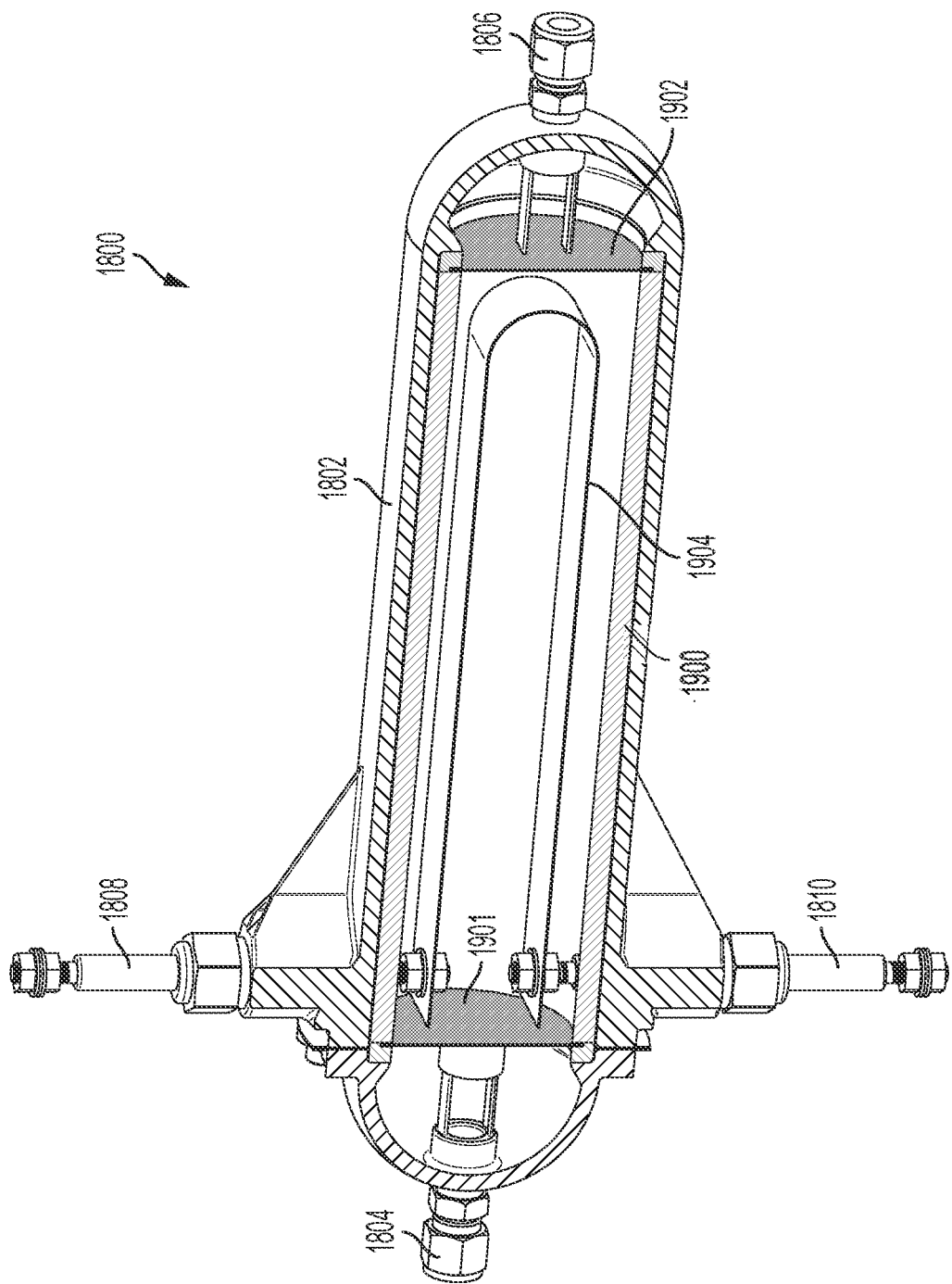
FIG. 19 is a cross-sectional view of an electric catalyst unit.

FIG. 19 is a cross-sectional view of the electric catalyst unit 1800. In an embodiment, a ceramic tube 1900 houses a catalyst. The ceramic tube 1900 acts as an insulator, and allows heat to be focused and reflected toward the catalyst, thereby heating the catalyst.

In an embodiment, a first screen 1901 and second screen 1902 are disposed at opposite ends within the ceramic tube 1900. The screens 1901, 1902 can be made from wire, a wire mesh, or another metallic mesh or matrix structure. In an embodiment, the screens 1901, 1902 can be made from a nickel alloy that is resistant to heated hydrogen gas that is generated from the cracking of ammonia, as well as resistant to the gaseous ammonia itself.

In an embodiment, a heating element 1904 is also disposed within the ceramic tube 1900. Electrical current is passed through the heating element 1904 in order to heat the heating element 1904 to a threshold temperature suitable to perform the ammonia cracking process. In an embodiment, the heating element 1904 and screens 1901, 1902 are made from a nickel alloy, or other material(s) resistant to hydrogen and ammonia, as nickel maintains a fairly constant resistance with high temperatures, as opposed to steel which has a lower resistance at high temperatures. Further, nickel alloys may have a higher resistance to corrosion during exposure to ammonia and hydrogen at high temperatures (which may be realized within the electrical catalyst unit 1800, such as, for example, temperatures in excess of 600° C.).

In a preferred embodiment, the heating element 1904 and the screens 1901, 1902 are made from Inconel® 625. In an embodiment, the heating element 1904 and the screens 1901, 1902 can be made from the same material. Alternatively, the heating element 1904 and the screens 1901, 1902 can be made from different materials.

In an embodiment, the heating element 1904 can be an air process heater, a cartridge heater, a tubular heater, a band heater, a strip heater, an etched foil heater (or a thin-film heater), a ceramic heater, a ceramic fiber heater, a resistance wire, and the like.

In an embodiment, respective ends of the heating element 1904 are in contact with the power feed-throughs 1808, 1810. The power feed-throughs 1808, 1810 provide electricity for energizing or heating the heating element 1904.

In an embodiment, the heating element 1904 is regulated via an electronic controller coupled to the power feed-throughs 1808, 1810 by utilizing readings from the thermocouples coupled to the radial fittings 1812, so that the heating element 1904 maintains a threshold temperature suitable to perform the ammonia cracking process. The threshold temperature can range from 400° C. to 700° C., and in a preferred embodiment, the threshold temperature is at least 600° C.

In an embodiment, the electronic controller can be used to control an electric expansion valve (not depicted in FIG. 19) that is coupled to the inlet 1804 by utilizing readings from the pressure transducer coupled to radial fitting 1814 and/or the thermocouples coupled to radial fittings 1812. Once the gaseous ammonia received by the electric catalyst unit 1800 from the heat exchange catalyst unit has reached the threshold temperature, the electric expansion valve is utilized to maintain the vapor pressure of the gaseous ammonia. At these threshold temperature and pressure values, the electric expansion valve is opened, allowing the ammonia to enter the ceramic tube 1900.

In an embodiment, catalyst, such as discrete catalyst media, is deposited into the ceramic tube. The gaseous ammonia undergoes a chemical reaction with the catalyst disposed within the ceramic tube 1900, and the resulting hydrogen and nitrogen components exit the electric catalyst unit 1800 via the outlet 1806 and are supplied to the downstream injection system for the engine.

In another embodiment, the heating element 1904 is coated with a catalyst that facilitates the ammonia cracking process, and discrete catalyst is not disposed within the ceramic tube 1900. In this embodiment, the catalyst is coated to the heating element 1904 using a washcoating or deposition technique to bind or adhere the catalyst to the surfaces of the heating element 1904.

In one embodiment, the heating element 1904 is a strip heater. The heating element 1904 can be coated on all surfaces with the catalyst, or alternatively, a catalyst sleeve can be placed over the strip heating element 1904. In an embodiment, the strip heating element 1904 can have a relatively low heat transfer efficiency so as to maintain a high skin (or boundary layer) temperature of the catalyst that externally coats the strip heating element 1904.

In another embodiment, the heating element 1904 is a spiral heater, a coil heater, or an air process heater, where the internal walls (which contain integral heating elements) are coated with the catalyst.

In yet another embodiment, the catalyst is coated on the interior wall(s) of the ceramic tube 1900. In this embodiment, the catalyst is coated to the interior wall(s) of the ceramic tube 1900 using a washcoating or deposition technique to bind or adhere the catalyst to the wall surfaces.

The remaining figures have been provided to show additional details and embodiments of the on-board ammonia cracking system.

While the principles of the disclosure have been illustrated in relation to the exemplary embodiments shown herein, the principles of the present invention are not limited thereto and include any modification, variation, or permutation thereof.

The invention claimed is:

1. An on-board ammonia cracking system for supplying fuel to an internal combustion engine, the system comprising:
   an ammonia tank containing ammonia;
   a heat exchange catalyst unit coupled to the ammonia tank, the heat exchange catalyst unit having an exhaust inlet, an exhaust outlet, an ammonia inlet, and a gas outlet, wherein the heat exchange catalyst unit receives exhaust from the internal combustion engine via the exhaust inlet, wherein the exhaust exits the heat exchange catalyst unit via the exhaust outlet;
   an electric catalyst unit coupled in series to the heat exchange catalyst unit via only the gas outlet;
   an expansion valve coupled to an inlet of the electric catalyst unit;
   an injection system coupled to the internal combustion engine; and
   a supply line coupled between the ammonia tank and the injection system, the supply line providing ammonia from the ammonia tank to the injection system, wherein if the exhaust gas has reached a temperature sufficient to perform ammonia cracking, the ammonia undergoes a cracking process in the heat exchange catalyst unit, wherein if the exhaust gas has not reached a temperature sufficient to perform ammonia cracking, the ammonia exits the heat exchange catalyst unit via the gas outlet and flows to the expansion valve which maintains the ammonia in a gaseous state as the ammonia enters the electric catalyst unit, and the ammonia subsequently undergoes the cracking process in the electric catalyst unit, wherein hydrogen resulting from the cracking process is supplied to the injection system for use as a co-fuel with ammonia from the supply line to power the internal combustion engine.

2. The system of claim 1, wherein the exhaust gas flows in a first direction through the heat exchange catalyst unit, and the ammonia flows in a second direction, opposite the first direction, through the heat exchange catalyst unit.

3. The system of claim 1, wherein the exhaust gas and the ammonia each flow in the same direction through the heat exchange catalyst unit.

4. The system of claim 1, wherein channels are formed in the heat exchange catalyst unit, and wherein discrete catalyst media is deposited in the channels.

5. The system of claim 4, where interior surfaces of the heat exchange catalyst unit are coated with a catalyst.

6. The system of claim 1, wherein the electric catalyst unit includes an electric heater.

7. The system of claim 1, wherein the heat exchange catalyst unit includes an exhaust gas channel and an ammonia channel, wherein the exhaust gas channel and the ammonia channel are oriented in a perpendicular fashion to one another.

8. An on-board ammonia cracking system for supplying fuel to an internal combustion engine, the system comprising:
an ammonia tank containing ammonia;
a heat exchange catalyst unit coupled to the ammonia tank, wherein the heat exchange catalyst unit receives exhaust gas from the internal combustion engine and receives the ammonia from the ammonia tank;
an electric catalyst unit coupled in series via a single fluid path to the heat exchange catalyst unit, the electric catalyst unit including an electric heater;
an expansion valve coupled to an inlet of the electric catalyst unit;
an injection system coupled to the internal combustion engine; and
a supply line coupled between the ammonia tank and the injection system, the supply line providing ammonia from the ammonia tank to the injection system,
wherein if the exhaust gas has reached a temperature sufficient to perform ammonia cracking, the ammonia undergoes a cracking process in the heat exchange catalyst unit,
wherein if the exhaust gas has not reached a temperature sufficient to perform ammonia cracking, the ammonia exits the heat exchange catalyst unit and flows to the expansion valve which maintains the ammonia in a gaseous state as the ammonia enters the electric catalyst unit, and the ammonia subsequently undergoes the cracking process in the electric catalyst unit, wherein hydrogen resulting from the cracking process flows to the injection system for use as a co-fuel with ammonia from the supply line to power the internal combustion engine.

9. The system of claim 8, wherein the ammonia flows in a first channel within the heat exchange catalyst unit the exhaust gas flows in a second channel within the heat exchange catalyst unit, wherein the first channel and second channel are oriented perpendicular to each other.

10. The system of claim 8, wherein when the ammonia undergoes the cracking process in the electric catalyst unit, the ammonia has been pre-heated in the heat exchange catalyst unit before flowing to the electric catalyst unit.

11. The system of claim 8, wherein the temperature sufficient to perform ammonia cracking ranges from 400° C. to 700° C.

12. The system of claim 8, wherein the electric heater is selected from a group consisting of an air process heater, a cartridge heater, a tubular heater, a band heater, a strip heater, an etched foil heater, a thin-film heater, a ceramic heater, a ceramic fiber heater, and a resistance wire.

13. The system of claim 8, wherein the exhaust gas flows in a first direction through the heat exchange catalyst unit, and the ammonia flows in a second direction, opposite the first direction, through heat exchange catalyst unit.

14. The system of claim 8, wherein the exhaust gas and the ammonia each flow in the same direction through the heat exchange catalyst unit.

15. An on-board ammonia cracking system for supplying fuel to an internal combustion engine, the system comprising:
an ammonia tank containing ammonia;
a heat exchange catalyst unit coupled to the ammonia tank, wherein the heat exchange catalyst unit receives exhaust gas from the internal combustion engine and receives the ammonia from the ammonia tank;
an electric catalyst unit coupled in series to the heat exchange catalyst unit via a single fluid path such that exhaust gas does not flow from the heat exchange catalyst unit to the electric catalyst unit;
an expansion valve coupled to an inlet of the electric catalyst unit, the expansion valve configured to maintain the ammonia in a gaseous state as the ammonia enters the electric catalyst unit;
an injection system coupled to the internal combustion engine; and
a supply line coupled between the ammonia tank and the injection system, the supply line providing ammonia from the ammonia tank to the injection system,
wherein the ammonia undergoes a cracking process in the heat exchange catalyst unit if the exhaust gas has reached a temperature sufficient to perform ammonia cracking, and
if the exhaust gas has not reached a temperature sufficient to perform ammonia cracking:
(1) the ammonia is pre-heated in the heat exchange catalyst unit,
(2) the pre-heated ammonia exits the heat exchange catalyst unit and flows to the electric catalyst unit, and
(3) the pre-heated ammonia undergoes the cracking process in the electric catalyst unit,
wherein hydrogen resulting from the cracking process is supplied to the injection system for use as a co-fuel with ammonia from the supply line to power the internal combustion engine.

16. The system of claim 15, wherein the electric catalyst unit includes an electric heater.

17. The system of claim 16, wherein the electric heater is selected from a group consisting of an air process heater, a cartridge heater, a tubular heater, a band heater, a strip heater, an etched foil heater, a thin-film heater, a ceramic heater, a ceramic fiber heater, and a resistance wire.

18. The system of claim 15, wherein the electric catalyst unit includes discrete catalyst media deposited within the electric catalyst unit.

19. The system of claim 15, wherein the temperature sufficient to perform ammonia cracking ranges from 400° C. to 700° C.

20. The system of claim 15, wherein channels are formed heat exchange catalyst unit, and wherein discrete catalyst media is deposited in the channels.

\* \* \* \* \*